(12) United States Patent
Wen et al.

(10) Patent No.: US 11,947,982 B2
(45) Date of Patent: Apr. 2, 2024

(54) UI ADAPTATION CONSTRAINT SOLVING METHOD AND RELATED APPARATUS

(71) Applicant: Huawei Technologies Co., Ltd., Shenzhen (CN)

(72) Inventors: Tao Wen, Hangzhou (CN); Xiao Xu, Hangzhou (CN); Jun Liu, Hangzhou (CN); Tengfei Cui, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/351,734

(22) Filed: Jul. 13, 2023

(65) Prior Publication Data
US 2023/0350702 A1  Nov. 2, 2023

Related U.S. Application Data

(63) Continuation of application No. PCT/CN2022/071571, filed on Jan. 12, 2022.

(30) Foreign Application Priority Data

Jan. 14, 2021  (CN) .......................... 202110051719.8

(51) Int. Cl.
*G06F 9/451* (2018.01)
*G06F 8/38* (2018.01)

(52) U.S. Cl.
CPC ................ *G06F 9/451* (2018.02); *G06F 8/38* (2013.01)

(58) Field of Classification Search
CPC .................................. G06F 9/451; G06F 8/38
See application file for complete search history.

(56) References Cited

U.S. PATENT DOCUMENTS

| | | | |
|---|---|---|---|
| 2008/0046462 A1* | 2/2008 | Kaufman | G06F 16/26 707/999.102 |
| 2008/0046557 A1* | 2/2008 | Cheng | G06F 8/38 709/224 |
| 2016/0092336 A1* | 3/2016 | Atanasiu | G06F 8/38 717/133 |
| 2020/0272438 A1* | 8/2020 | Klemenz | G06F 8/35 |
| 2020/0293342 A1* | 9/2020 | Torman | G06F 8/34 |
| 2022/0383572 A1* | 12/2022 | Hu | G06V 10/774 |
| 2023/0205962 A1* | 6/2023 | Zhao | G06F 30/39 716/120 |

\* cited by examiner

*Primary Examiner* — Tadesse Hailu
(74) *Attorney, Agent, or Firm* — Conley Rose, P.C.

(57) ABSTRACT

A plurality of constraint relationships in a UI are identified and grouped into two types, a constraint relationship of a first type is solved in an integrated development environment (IDE), and a constraint relationship of a second type is a constraint relationship solved in a terminal or the IDE. The plurality of constraint relationships are used to determine a layout of one or more components in the UI. The IDE calculates a first intermediate solution set based on the constraint relationship of the first type in the plurality of constraint relationships. The first intermediate solution set is used to determine the layout of the one or more components in the UI together with the constraint relationship of the second type.

20 Claims, 8 Drawing Sheets

(a) (b)

UI ADAPTATION CONSTRAINT SOLVING METHOD AND RELATED APPARATUS

CROSS-REFERENCE TO RELATED APPLICATIONS

This application is a continuation of International Patent Application No. PCT/CN2022/071571, filed on Jan. 12, 2022, which claims priority to Chinese Patent Application No. 202110051719.8, filed on Jan. 14, 2021. The disclosures of the aforementioned applications are hereby incorporated by reference in their entireties.

TECHNICAL FIELD

The present disclosure relates to the field of computer technologies, and in particular, to a user interface (UI) adaptation constraint solving method and a related apparatus.

BACKGROUND

With rapid development of electronic technologies, there are more types of terminals. Therefore, there is a more prominent difference between display areas of the terminals. How to adapt to screens of different terminals in a development process becomes a common problem in the industry. In consideration of display effects of different terminals, an adaptive design solution is widely used in the industry: A plurality of interfaces are developed to adapt to requirements of the different terminals. In the solution, although good experience can be gained on the different terminals, there are still some disadvantages. For example, to adapt to the different terminals, the plurality of interfaces need to be developed, to increase a workload of an application developer. For another example, when a display area of a terminal dynamically changes, in this solution, a display policy cannot be dynamically adjusted to gain optimal display experience. For another example, to support a terminal with new screen resolution and a new display area, an interface needs to be additionally developed for adaptation. A reason for the disadvantages is that in the adaptation solution, a size of the display area and resolution information of the terminal need to be obtained, and then an appropriate interface is loaded based on such information.

To resolve the foregoing problem existing in an adaptive layout solution, a constraint layout solution is proposed in the industry. Currently, a constraint layout is constructed by using a flexible constraint system, marks and describes a mutual location relationship between view components, and blurs a limitation imposed by the display area. In a display process of the terminal, an optimal display solution in a current display area can be obtained by solving a layout constraint linear equation in real time, to greatly improve UI adaptability. Currently, a Cassowary algorithm is usually used to complement solving of the layout constraint linear equation. In the Cassowary algorithm, for a system of linear equations, a possible value of a variable is found in an incremental convergence manner, so that a target function has a maximum or minimum value. When a constraint of a specific equation in the system of linear equations changes, in the algorithm, a solution that enables the target function to have the maximum or minimum value is recalculated in a gradual convergence manner. A Cassowary linear constraint algorithm is obtained by optimizing a dual simplex algorithm (a simplex algorithm, which is usually used to obtain a numerical solution to a linear programming problem in the digital optimization field). When a constraint is added or removed, a local error gain and a weighted sum are compared to process constraints at different levels in an incremental manner. However, constraint solving is optimized on a terminal currently. Once the terminal cannot provide sufficient computing power, constraint solving consumes a long period of time, to reduce UI rendering efficiency.

SUMMARY

Embodiments of the present disclosure disclose a UI adaptation constraint solving method and a related apparatus, to improve UI rendering efficiency of a terminal.

According to a first aspect, an embodiment of the present disclosure discloses a UI adaptation constraint solving method. The method includes: obtaining a plurality of constraint relationships in a user interface UI, where the plurality of constraint relationships are used to determine a layout of one or more components in the UI. Optionally, each constraint relationship represents a location of a component in the UI, and the location may be a location relative to another component or an invisible guideline. The invisible guideline is a reference line for reference and comparison in the UI, is an invisible line, and is used to measure a location of a component in the UI. A component may have one or at least two constraint relationships. When at least two constraint relationships exist, each of the at least two constraint relationships can only constrain a location of the component to some extent (for example, a constraint relationship constrains only a location of the component relative to a left component, and the other constraint relationship constrains a location of the component relative to an upper component). The at least two constraint relationships can be combined to more accurately constrain a location of the component in the UI.

A first intermediate solution set is calculated based on a constraint relationship of a first type in the plurality of constraint relationships. The constraint relationship of the first type is a constraint relationship solved in an integrated development environment (IDE), the first intermediate solution set is used to determine the layout of the one or more components in the UI together with a constraint relationship of a second type in the plurality of constraint relationships, and the constraint relationship of the second type is a constraint relationship solved in a terminal or the IDE. In the method, the plurality of constraint relationships in the UI are grouped into the first type and the second type, the constraint relationship of the first type is set to be solved in the IDE, and the constraint relationship of the second type is allowed to be solved in the terminal. Based on this mechanism, most solving operations can be basically completed in the IDE, to significantly reduce calculation pressure existing when the terminal renders the UI, and improve UI rendering efficiency.

With reference to the first aspect, in a possible implementation of the first aspect, the constraint relationship of the second type includes a constraint relationship related to a display scenario, or the constraint relationship of the second type includes a constraint relationship of which data of the terminal needs to be used for a solving process. Optionally, the constraint relationship of the second type is identified based on a keyword in each constraint relationship. The keyword indicates that the constraint relationship is a constraint relationship related to the display scenario or a constraint relationship of which the data of the terminal needs to be used for a solving process. In addition, a constraint relationship including no keyword is a constraint relationship of the first type.

With reference to any one of the first aspect and the possible implementations of the first aspect, in another possible implementation of the first aspect, a manner of obtaining the constraint relationship of the second type through grouping may be as follows: A constraint relationship marked with a first keyword (for example, words such as Vstack and Hstack in an annotation) is grouped as the second type, and the constraint relationship marked with the first keyword is a constraint relationship of the display scenario; and a constraint relationship marked with a second keyword (for example, a Bindou function) is grouped as the second type, and the constraint relationship marked with the second keyword is a constraint relationship of which the data of the terminal needs to be used for a solving process.

It can be understood that, because different terminals usually have different display scenarios and different device parameters, a constraint relationship of a specific display scenario or a specific group of device parameters are not applicable to all terminals. Therefore, a constraint relationship of a display scenario and a constraint relationship of which the data of the terminal needs to be used for a solving process are grouped as the second type, to conveniently perform a differentiated operation, so that layout information required by different terminals can be determined in a targeted manner when a UI layout is determined.

With reference to any one of the first aspect and the possible implementations of the first aspect, in a second possible implementation of the first aspect, a manner of obtaining the constraint relationship of the first type through grouping may be as follows: a constraint relationship that is marked with neither the first keyword nor the second keyword is grouped as the first type.

It can be understood that because the constraint relationship that is marked with neither the first keyword nor the second keyword is usually applicable to various devices in various practical scenarios, the constraint relationship is grouped as the first type for unified processing, to reduce calculation overheads.

With reference to any one of the first aspect and the possible implementations of the first aspect, in a third possible implementation of the first aspect, the display scenario includes at least one of a special-shaped screen scenario, a foldable-screen scenario, a landscape-mode display scenario, and a portrait-mode display scenario.

With reference to any one of the first aspect and the possible implementations of the first aspect, in a fourth possible implementation of the first aspect, the data of the terminal includes a device parameter of the terminal and data generated during running of the terminal.

With reference to any one of the first aspect and the possible implementations of the first aspect, in a fifth possible implementation of the first aspect, the method further includes: calculating constraint solution information, where the constraint solution information is solution information calculated based on the first intermediate solution set and the constraint relationship of the second type.

It can be understood that solving may be further performed based on the first intermediate solution set and a constraint of the second type. In this way, a calculation amount of the terminal can be further reduced, to improve UI rendering efficiency of the terminal.

With reference to any one of the first aspect and the possible implementations of the first aspect, in a sixth possible implementation of the first aspect, the constraint relationship of the second type includes a constraint relationship of M display scenarios, a constraint relationship of N device parameters, and a constraint relationship of P pieces of data generated during running, where M, N, and P each are a positive integer; and the calculating constraint solution information includes: calculating M second intermediate solution sets based on the first intermediate solution set, the constraint relationship of the P pieces of data generated during running, and the constraint relationship of the M display scenarios, where different second intermediate solution sets are calculated based on different constraint relationships of display scenarios, the constraint solution information includes the M second intermediate solution sets and the constraint relationship of the N device parameters, and the constraint relationship of the device parameter is a constraint relationship of which the device parameter of the terminal needs to be used for solving. Optionally, the constraint relationship of the display scenario is a constraint relationship of which the display scenario needs to be used for solving, and the constraint relationship of the data generated during running is a constraint relationship of which data generated during running of a device needs to be used for solving.

In this embodiment of the present disclosure, the device parameter, the display scenario, and the data generated during running of the terminal are main factors that affect a UI display effect. For example, a device parameter of an iPad and a device parameter of a mobile phone are different. Therefore, an app of a same type needs to be displayed differently on the two terminals, so that a user can gain better visual experience. For another example, a landscape mode and a portrait mode of a common mobile phone belong to two different display scenarios, and differentiated display needs to be performed for the two display scenarios, so that the user can gain better visual experience. For another example, for a chat application on the terminal, when a too large quantity of chat words are generated during running of the terminal, differentiated display is required, so that the user can gain better visual experience. In consideration of this, the present disclosure proposes that the constraint relationship of the device parameter, the constraint relationship of the display scenario, and the constraint relationship of the data generated during running of the terminal are solved in a process of determining the UI layout, to reflect that the device parameter, the display scenario, and the data generated during running of the terminal affect the UI display effect.

In this embodiment of the present disclosure, a corresponding constraint relationship may be set for each display scenario existing on the market (each display scenario corresponds to a constraint relationship), or a corresponding constraint relationship may be set for a typical display scenario (each display scenario corresponds to a constraint relationship). Some or all of constraint relationships that are of display scenarios and that are obtained in this manner are the constraint relationship of the M display scenarios in this embodiment of the present disclosure. In addition, in the present disclosure, a specific type (for example, a length, a width, and a height of the terminal) of a device parameter (specifically, an inherent parameter of a device) that affects display of the UI is considered, and a corresponding constraint relationship is set to reflect impact of the device parameter of the type on display of the UI, to obtain the constraint relationship of the N device parameters. To solve the constraint relationship, the device parameter is input. In addition, in the present disclosure, data that may be generated in a running process of the terminal and that affects display of the UI is further considered. A constraint relationship may be set for the data. The constraint relationship is used to reflect impact, of the data generated during running of the terminal, on display of the UI. To solve the constraint relationship, the data generated during running of the terminal is input. In this manner, the M second intermediate solution sets are separately calculated for the M display scenarios. In this way, the second intermediate solution sets may be subsequently provided for the terminal in different display scenarios in a targeted manner, to help various terminals determine the UI layout in each display scenario.

With reference to any one of the first aspect and the possible implementations of the first aspect, in a seventh possible implementation of the first aspect, the constraint relationship of the second type includes the constraint relationship of the M display scenarios, the constraint relationship of the N device parameters, and the constraint relationship of the P pieces of data generated during running, where M, N, and P each are a positive integer; and the calculating constraint solution information includes: calculating one or more pieces of third information based on the first intermediate solution set, the constraint relationship of the P pieces of data generated during running, the constraint relationship of the N device parameters, and one or more groups of device parameters, where different third information is calculated based on different device parameters, and the constraint solution information includes the plurality of pieces of third information.

In this manner, a plurality of pieces of third information is separately calculated for a plurality of groups of device parameters. In this way, the third information can be subsequently provided for terminals with different device parameters in a targeted manner, to help various terminals determine the UI layout.

With reference to any one of the first aspect and the possible implementations of the first aspect, in an eighth possible implementation of the first aspect, the constraint relationship of the second type includes the constraint relationship of the M display scenarios, the constraint relationship of the N device parameters, and the constraint relationship of the P pieces of data generated during running, where M, N, and P each are a positive integer; and the calculating constraint solution information includes: calculating one or more pieces of fourth information based on the constraint relationship of the P pieces of data generated during running, the M second intermediate solution sets, the constraint relationship of the N device parameters, and the one or more groups of device parameters, where different fourth information is calculated based on different second intermediate solution sets or different device parameters, the M second intermediate solution sets are calculated based on the first intermediate solution set, the constraint relationship of the P pieces of data generated during running, and the constraint relationship of the M display scenarios, different second intermediate solution sets are calculated based on different constraint relationship of display scenarios, and the constraint solution information includes the plurality of pieces of fourth information.

In this manner, a plurality of pieces of fourth information is separately calculated for the M display scenarios and a plurality of groups of device parameters. In this way, the fourth information may be subsequently provided for different device parameters and terminals in different display scenarios in a targeted manner, to help terminals with various device parameters in various display scenarios determine the UI layout.

With reference to any one of the first aspect and the possible implementations of the first aspect, in a ninth possible implementation of the first aspect, the obtaining a plurality of constraint relationships in a UI includes: responding to an input operation performed by a user, to obtain the plurality of constraint relationships, where the input operation includes at least one of a drag operation and a write operation, the drag operation is performed to drag the one or more components to a location on a screen, the plurality of constraint relationships are related to a location of the one or more components on the screen, and the write operation is performed to write one or more of the plurality of constraint relationships.

With reference to any one of the first aspect and the possible implementations of the first aspect, in a tenth possible implementation of the first aspect, before the first intermediate solution set is calculated based on the constraint relationship of the first type in the plurality of constraint relationships, the method further includes: correcting a type of the plurality of constraint relationships based on a selection operation entered by the user, to determine the constraint relationship of the first type and the constraint relationship of the second type in the plurality of constraint relationships.

Herein, the IDE first automatically groups the constraint relationships into types, and then the types are further corrected manually, to not only improve grouping efficiency, but also ensure grouping accuracy.

According to a second aspect, an embodiment of the present disclosure provides a UI adaptation constraint solving method. The method includes: receiving a resource file, where the resource file includes at least one of a first intermediate solution set and constraint solution information, the constraint solution information is solution information calculated based on the first intermediate solution set and a constraint relationship of a second type, the first intermediate solution set is determined based on a constraint relationship of a first type, the constraint relationship of the first type is a constraint relationship solved in an IDE, the constraint relationship of the second type is a constraint relationship solved in a terminal or the IDE, and the constraint relationship is used to describe a layout of one or more components in a UI of the terminal; and determining the layout of the components in the UI of the terminal based on the resource file.

In the method, a plurality of constraint relationships in the UI are grouped into the first type and the second type, the constraint relationship of the first type is set to be solved in the IDE, and the constraint relationship of the second type is allowed to be solved in the terminal. Based on this mechanism, most solving operations can be basically completed in the IDE, to significantly reduce calculation pressure existing when the terminal renders the UI, and improve UI rendering efficiency.

With reference to the second aspect, in a first possible implementation of the second aspect, a constraint relationship marked with a first keyword (for example, words such as Vstack and Hstack in an annotation) is grouped as the second type, and the constraint relationship marked with the first keyword is a constraint relationship of a display scenario; and a constraint relationship marked with a second keyword (for example, a Bindo function) is grouped as the second type, and the constraint relationship marked with the second keyword is constraint relationship of which data of the terminal needs to be used for a solving process.

It can be understood that, because different terminals usually have different display scenarios and different device parameters, a constraint relationship of a specific display scenario or a specific group of device parameters are not applicable to all terminals. Therefore, a constraint relationship of a display scenario and a constraint relationship of which the data of the terminal needs to be used for a solving process are grouped as the second type, to conveniently perform a differentiated operation, so that layout information required by different terminals can be determined in a targeted manner when a UI layout is determined.

With reference to any one of the second aspect and the possible implementations of the second aspect, in a second possible implementation of the second aspect, a constraint relationship that is marked with neither the first keyword nor the second keyword is grouped as the first type.

It can be understood that because the constraint relationship that is marked with neither the first keyword nor the second keyword is usually applicable to various devices in various practical scenarios, the constraint relationship is grouped as the first type for unified processing, to reduce calculation overheads.

With reference to any one of the second aspect and the possible implementations of the second aspect, in a third possible implementation of the second aspect, the display scenario includes at least one of a special-shaped screen scenario, a foldable-screen scenario, a landscape-mode display scenario, and a portrait-mode display scenario.

With reference to any one of the second aspect and the possible implementations of the second aspect, in a fourth possible implementation of the second aspect, the data of the terminal includes an inherent device parameter of the terminal and data generated during running of the terminal.

With reference to any one of the second aspect and the possible implementations of the second aspect, in a fifth possible implementation of the second aspect, a constraint relationship grouped as the second type includes a constraint relationship of M display scenarios, a constraint relationship of N device parameters, and a constraint relationship of P pieces of data generated during running, where M, N, and P each are a positive integer; the constraint solution information includes at least two of second information, a plurality of pieces of third information, and a plurality of pieces of fourth information; the second information includes M second intermediate solution sets and the constraint relationship of the N device parameters, each second intermediate solution set is a solution set calculated based on the first intermediate solution set, the constraint relationship of the P pieces of data generated during running, and the constraint relationship of one of the M display scenarios, and different second intermediate solution sets are calculated based on different constraint relationships of display scenarios; the plurality of pieces of third information include solution information calculated based on the first intermediate solution set, the constraint relationship of the P pieces of data generated during running, the constraint relationship of the N device parameters, and a plurality of groups of device parameters, and different third information is calculated based on different device parameters; and the plurality of pieces of fourth information include solution information calculated based on the M second intermediate solution sets, the constraint relationship of the N device parameters, and the plurality of groups of device parameters, and different fourth information is calculated based on different second intermediate solution sets or device parameters, where the constraint relationship of the device parameter is a constraint relationship for solving a device parameter of a terminal that needs to be used.

With reference to any one of the second aspect and the possible implementations of the second aspect, in a sixth possible implementation of the second aspect, the determining the layout of the components in the UI of the terminal based on the resource file includes: if a display scenario of the terminal is not one of the M display scenarios and the device parameter of the terminal does not belong to one group of device parameters in the plurality of groups of device parameters, determining a UI layout of the terminal based on the first intermediate solution set, the constraint relationship of the N device parameters, and the constraint relationship of the P pieces of data generated during running; or if a display scenario of the terminal is not one of the M display scenarios and the device parameter of the terminal belongs to one group of device parameters in the plurality of groups of device parameters, determining a UI layout of the terminal based on one piece of third information, where a device parameter used to calculate the one piece of third information is the same as the device parameter of the terminal; or if a display scenario of the terminal is one of the M display scenarios but the device parameter of the terminal does not belong to any one of the plurality of groups of device parameters, determining a UI layout of the terminal based on one second intermediate solution set in the second information, the constraint relationship of the N device parameters, and the device parameter of the terminal, where the one second intermediate solution set is calculated based on a constraint relationship of the display scenario of the terminal; or if a display scenario of the terminal is one of the M display scenarios and the device parameter of the terminal belongs to one group of device parameters in the plurality of groups of device parameters, determining a UI layout of the terminal based on one piece of fourth information, where a second intermediate solution set used to calculate the one piece of fourth information is calculated based on a constraint relationship of the display scenario of the terminal, and a device parameter used to calculate the one piece of fourth information is the same as the device parameter of the terminal.

In this manner, the terminal obtains the first information, the second information, the third information, and the fourth information that are solution information obtained in different calculation phases, and then selects, in a targeted manner based on the display scenario and the device parameter of the terminal, information that is closest to a final solution. Therefore, a calculation amount existing when the terminal calculates the final solution can be reduced as much as possible, and UI rendering efficiency can be improved.

With reference to any one of the second aspect and the possible implementations of the second aspect, in a seventh possible implementation of the second aspect, a constraint relationship grouped as the second type includes a constraint relationship of M display scenarios, a constraint relationship of N device parameters, and a constraint relationship of P pieces of data generated during running; and before the receiving a resource file, the method further includes: sending description information to a server, where the description information is used to describe a display scenario and the device parameter of the terminal, where if the server determines that the display scenario of the terminal is not one of the M display scenarios and the device parameter of the terminal does not belong to one group of device parameters in the plurality of groups of device parameters, the resource file includes the first intermediate solution set, the constraint relationship of the N device parameters, and the constraint relationship of the P pieces of data generated during running; or if the server determines that the display scenario of the terminal is not one of the M display scenarios and the device parameter of the terminal belongs to one group of device parameters in the plurality of groups of device parameters, the resource file includes one piece of third information, the piece of third information includes solution information calculated based on the first intermediate solution set, the constraint relationship of the P pieces of data generated during running, the constraint relationship of the N device parameters, and the one group of device parameters, and the group of device parameters are the same as the device parameter of the terminal; or if the server determines that the display scenario of the terminal is one of the M display scenarios but the device parameter of the terminal does not belong to any one of the plurality of groups of device parameters, the resource file includes one second intermediate solution set and the constraint relationship of the N device parameters, and the one second intermediate solution set is a solution set calculated based on the first intermediate solution set, the constraint relationship of the P pieces of data generated during running, and the constraint relationship of the display scenario of the terminal; or if the server determines that the display scenario of the terminal is one of the M display scenarios and the device parameter of the terminal belongs to one group of device parameters in a plurality of groups of device parameters, the resource file includes one piece of fourth information, the one piece of fourth information includes solution information calculated based on the one second intermediate solution set, the constraint relationship of the N device parameters, and the one group of device parameters, and the constraint relationship of the device parameter is a constraint relationship of which the device parameter of the terminal needs to be used for solving.

In this manner, the terminal obtains the first information, the second information, the third information, and the fourth information that are solution information obtained in different calculation phases, and then selects, in a targeted manner based on the display scenario and the device parameter of the terminal, information that is closest to a final solution. Therefore, a calculation amount existing when the terminal calculates the final solution can be reduced as much as possible. In addition, the information that is closest to the final solution is selected by a device (for example, the IDE) other than the terminal. Therefore, the calculation amount of the terminal is further reduced, and UI rendering efficiency of the terminal can be improved.

According to a third aspect, an embodiment of the present disclosure provides a UI adaptation constraint solving apparatus. The apparatus includes: a first obtaining unit configured to obtain a plurality of constraint relationships in a user interface UI, where the plurality of constraint relationships are used to determine a layout of one or more components in the UI; and a calculation unit configured to calculate a first intermediate solution set based on a constraint relationship of a first type in the plurality of constraint relationships, where the constraint relationship of the first type is a constraint relationship solved in an IDE, the first intermediate solution set is used to determine the layout of the one or more components in the UI together with a constraint relationship of a second type in the plurality of constraint relationships, and the constraint relationship of the second type is a constraint relationship solved in a terminal or the IDE.

In the method, a plurality of constraint relationships in the UI are grouped into the first type and the second type, the constraint relationship of the first type is set to be solved in the IDE, and the constraint relationship of the second type is allowed to be solved in the terminal. Based on this mechanism, most solving operations can be basically completed in the IDE, to significantly reduce calculation pressure existing when the terminal renders the UI, and improve UI rendering efficiency.

With reference to the third aspect, in a possible implementation of the third aspect, the constraint relationship of the second type includes a constraint relationship related to a display scenario, or the constraint relationship of the second type includes a constraint relationship of which data of the terminal needs to be used for a solving process. Optionally, the constraint relationship of the second type is identified based on a keyword in each constraint relationship. The keyword indicates that the constraint relationship is a constraint relationship related to the display scenario or a constraint relationship of which the data of the terminal needs to be used for a solving process. In addition, a constraint relationship including no keyword is a constraint relationship of the first type.

With reference to any one of the third aspect and the possible implementations of the third aspect, in another possible implementation of the third aspect, a manner of obtaining the constraint relationship of the second type through grouping may be specifically as follows: a constraint relationship marked with a first keyword (for example, words such as Vstack and Hstack in an annotation) is grouped as the second type, and the constraint relationship marked with the first keyword is a constraint relationship of a display scenario; and a constraint relationship marked with a second keyword (for example, a Bind() function) is grouped as the second type, and the constraint relationship marked with the second keyword is constraint relationship of which data of the terminal needs to be used for a solving process.

It can be understood that, because different terminals usually have different display scenarios and different device parameters, a constraint relationship of a specific display scenario or a specific group of device parameters are not applicable to all terminals. Therefore, a constraint relationship of a display scenario and a constraint relationship of which the data of the terminal needs to be used for a solving process are grouped as the second type, to conveniently perform a differentiated operation, so that layout information required by different terminals can be determined in a targeted manner when a UI layout is determined.

With reference to any one of the third aspect and the possible implementations of the third aspect, in a second possible implementation of the third aspect, a manner of obtaining the constraint relationship of the first type through grouping may be specifically as follows: a constraint relationship that is marked with neither the first keyword nor the second keyword is grouped as the first type.

It can be understood that because the constraint relationship that is marked with neither the first keyword nor the second keyword is usually applicable to various devices in various practical scenarios, the constraint relationship is grouped as the first type for unified processing, to reduce calculation overheads.

With reference to any one of the third aspect and the possible implementations of the third aspect, in a third possible implementation of the third aspect, the display scenario includes at least one of a special-shaped screen scenario, a foldable-screen scenario, a landscape-mode display scenario, and a portrait-mode display scenario.

With reference to any one of the third aspect and the possible implementations of the third aspect, in a fourth possible implementation of the third aspect, the data of the terminal includes an inherent device parameter of the terminal and data generated during running of the terminal.

With reference to any one of the third aspect and the possible implementations of the third aspect, in a fifth possible implementation of the third aspect, the calculation unit is further configured to: calculate constraint solution information, where the constraint solution information is solution information calculated based on the first intermediate solution set and the constraint relationship of the second type.

It can be understood that solving may be further performed based on the first intermediate solution set and a constraint of the second type. In this way, a calculation amount of the terminal can be further reduced, to improve UI rendering efficiency of the terminal.

With reference to any one of the third aspect and the possible implementations of the third aspect, in a sixth possible implementation of the third aspect, the constraint relationship of the second type includes a constraint relationship of M display scenarios, a constraint relationship of N device parameters, and a constraint relationship of P pieces of data generated during running, where M, N, and P each are a positive integer; and in terms of calculating the constraint solution information, the calculation unit is further configured to: calculate M second intermediate solution sets based on the first intermediate solution set, the constraint relationship of the P pieces of data generated during running, and the constraint relationship of the M display scenarios, where different second intermediate solution sets are calculated based on different constraint relationships of display scenarios, the constraint solution information includes the M second intermediate solution sets and the constraint relationship of the N device parameters, the constraint relationship of the device parameter is a constraint relationship of which the device parameter of the terminal needs to be used for solving, the constraint relationship of the display scenario is a constraint relationship of which the display scenario needs to be used for solving, and the constraint relationship of the data generated during running is a constraint relationship of which data generated during running of a device needs to be used for solving.

In this manner, the M second intermediate solution sets are separately calculated for the M display scenarios. In this way, the second intermediate solution sets may be subsequently provided for the terminal in different display scenarios in a targeted manner, to help various terminals determine the UI layout.

With reference to any one of the third aspect and the possible implementations of the third aspect, in a seventh possible implementation of the third aspect, the constraint relationship of the second type includes the constraint relationship of the M display scenarios, the constraint relationship of the N device parameters, and a constraint relationship of the P pieces of data generated during running, where M, N, and P each are a positive integer; and in terms of calculating the constraint solution information, the calculation unit is further configured to: calculate one or more pieces of third information based on the first intermediate solution set, the constraint relationship of the P pieces of data generated during running, the constraint relationship of the N device parameters, and one or more groups of device parameters, where different third information is calculated based on different device parameters, and the constraint solution information includes the plurality of pieces of third information.

In this manner, a plurality of pieces of third information is separately calculated for a plurality of groups of device parameters. In this way, the third information can be subsequently provided for terminals with different device parameters in a targeted manner, to help various terminals determine the UI layout.

With reference to any one of the third aspect and the possible implementations of the third aspect, in an eighth possible implementation of the third aspect, the constraint relationship of the second type includes the constraint relationship of the M display scenarios, the constraint relationship of the N device parameters, and a constraint relationship of the P pieces of data generated during running, where M, N, and P each are a positive integer; and in terms of calculating the constraint solution information, the calculation unit is further configured to: calculate one or more pieces of fourth information based on the constraint relationship of the P pieces of data generated during running, the M second intermediate solution sets, the constraint relationship of the N device parameters, and the one or more groups of device parameters, where different fourth information is calculated based on different second intermediate solution sets or different device parameters, the M second intermediate solution sets are calculated based on the first intermediate solution set, the constraint relationship of the P pieces of data generated during running, and the constraint relationship of the M display scenarios, different second intermediate solution sets are calculated based on different constraint relationship of display scenarios, and the constraint solution information includes the plurality of pieces of fourth information.

In this manner, a plurality of pieces of fourth information is separately calculated for the M display scenarios and a plurality of groups of device parameters. In this way, the fourth information may be subsequently provided for different device parameters and terminals in different display scenarios in a targeted manner, to help terminals with various device parameters in various display scenarios determine the UI layout.

With reference to any one of the third aspect and the possible implementations of the third aspect, in a ninth possible implementation of the third aspect, in terms of obtaining the plurality of constraint relationships in the UI, the first output unit is further configured to: respond to an input operation performed by a user, to obtain the plurality of constraint relationships, where the input operation includes at least one of a drag operation and a write operation, the drag operation is performed to drag the one or more components to a location on a screen, the plurality of constraint relationships are related to a location of the one or more components on the screen, and the write operation is performed to write one or more of the plurality of constraint relationships.

With reference to any one of the third aspect and the possible implementations of the third aspect, in a tenth possible implementation of the third aspect, the apparatus further includes: a correction unit configured to: before the calculation unit calculates the first intermediate solution set based on the constraint relationship of the first type in the plurality of constraint relationships, correct a type of the plurality of constraint relationships based on a selection operation entered by the user, to determine the constraint relationship of the first type and the constraint relationship of the second type in the plurality of constraint relationships.

Herein, the IDE first automatically groups the constraint relationships into types, and then the types are further corrected manually, to not only improve grouping efficiency, but also ensure grouping accuracy.

According to a fourth aspect, an embodiment of the present disclosure provides a UI adaptation constraint solving apparatus. The apparatus includes: a receiving unit configured to receive a resource file, where the resource file includes at least one of a first intermediate solution set and constraint solution information, the constraint solution information is solution information calculated based on the first intermediate solution set and a constraint relationship of a second type, the first intermediate solution set is determined based on a constraint relationship of a first type, the constraint relationship of the first type is a constraint relationship solved in an IDE, the constraint relationship of the second type is a constraint relationship solved in a terminal or the IDE, and the constraint relationship is used to describe a layout of one or more components in a UI of the terminal; and a determining unit configured to determine the layout of the components in the UI of the terminal based on the resource file.

In the method, a plurality of constraint relationships in the UI are grouped into the first type and the second type, the constraint relationship of the first type is set to be solved in the IDE, and the constraint relationship of the second type is allowed to be solved in the terminal. Based on this mechanism, most solving operations can be basically completed in the IDE, to significantly reduce calculation pressure existing when the terminal renders the UI, and improve UI rendering efficiency.

With reference to the fourth aspect, in a first possible implementation of the fourth aspect, a constraint relationship marked with a first keyword (for example, words such as Vstack and Hstack in an annotation) is grouped as the second type, and the constraint relationship marked with the first keyword is a constraint relationship of a display scenario; and a constraint relationship marked with a second keyword (for example, a Bind() function) is grouped as the second type, and the constraint relationship marked with the second keyword is constraint relationship of which data of the terminal needs to be used for a solving process.

It can be understood that, because different terminals usually have different display scenarios and different device parameters, a constraint relationship of a specific display scenario or a specific group of device parameters are not applicable to all terminals. Therefore, a constraint relationship of a display scenario and a constraint relationship of which the data of the terminal needs to be used for a solving process are grouped as the second type, to conveniently perform a differentiated operation, so that layout information required by different terminals can be determined in a targeted manner when a UI layout is determined.

With reference to any one of the fourth aspect and the possible implementations of the fourth aspect, in a second possible implementation of the fourth aspect, a constraint relationship that is marked with neither the first keyword nor the second keyword is grouped as the first type.

It can be understood that because the constraint relationship that is marked with neither the first keyword nor the second keyword is usually applicable to various devices in various practical scenarios, the constraint relationship is grouped as the first type for unified processing, to reduce calculation overheads.

With reference to any one of the fourth aspect and the possible implementations of the fourth aspect, in a third possible implementation of the fourth aspect, the display scenario includes at least one of a special-shaped screen scenario, a foldable-screen scenario, a landscape-mode display scenario, and a portrait-mode display scenario.

With reference to any one of the fourth aspect and the possible implementations of the fourth aspect, in a fourth possible implementation of the fourth aspect, the data of the terminal includes an inherent device parameter of the terminal and data generated during running of the terminal.

With reference to any one of the fourth aspect and the possible implementations of the fourth aspect, in a fifth possible implementation of the fourth aspect, a constraint relationship grouped as the second type includes a constraint relationship of M display scenarios, a constraint relationship of N device parameters, and a constraint relationship of P pieces of data generated during running, where M, N, and P each are a positive integer; the constraint solution information includes at least two of second information, a plurality of pieces of third information, and a plurality of pieces of fourth information; the second information includes M second intermediate solution sets and the constraint relationship of the N device parameters, each second intermediate solution set is a solution set calculated based on the first intermediate solution set, the constraint relationship of the P pieces of data generated during running, and the constraint relationship of one of the M display scenarios, and different second intermediate solution sets are calculated based on different constraint relationships of display scenarios; the plurality of pieces of third information include solution information calculated based on the first intermediate solution set, the constraint relationship of the P pieces of data generated during running, the constraint relationship of the N device parameters, and a plurality of groups of device parameters, and different third information is calculated based on different device parameters; and the plurality of pieces of fourth information include solution information calculated based on the M second intermediate solution sets, the constraint relationship of the N device parameters, and the plurality of groups of device parameters, and different fourth information is calculated based on different second intermediate solution sets or device parameters, where the constraint relationship of the device parameter is a constraint relationship for solving a device parameter of a terminal that needs to be used.

With reference to any one of the fourth aspect and the possible implementations of the fourth aspect, in a sixth possible implementation of the fourth aspect, when determining the layout of the components in the UI of the terminal based on the resource file, the determining unit is further configured to: if a display scenario of the terminal is not one of the M display scenarios and the device parameter of the terminal does not belong to one group of device parameters in the plurality of groups of device parameters, determine a UI layout of the terminal based on the first intermediate solution set, the constraint relationship of the N device parameters, and the constraint relationship of the P pieces of data generated during running; or if a display scenario of the terminal is not one of the M display scenarios and the device parameter of the terminal belongs to one group of device parameters in the plurality of groups of device parameters, determine a UI layout of the terminal based on one piece of third information, where a device parameter used to calculate the one piece of third information is the same as the device parameter of the terminal; or if a display scenario of the terminal is one of the M display scenarios but the device parameter of the terminal does not belong to any one of the plurality of groups of device parameters, determine a UI layout of the terminal based on one second intermediate solution set in the second information, the constraint relationship of the N device parameters, and the device parameter of the terminal, where the one second intermediate solution set is calculated based on a constraint relationship of the display scenario of the terminal; or if a display scenario of the terminal is one of the M display scenarios and the device parameter of the terminal belongs to one group of device parameters in the plurality of groups of device parameters, determine a UI layout of the terminal based on one piece of fourth information, where a second intermediate solution set used to calculate the one piece of fourth information is calculated based on a constraint relationship of the display scenario of the terminal, and a device parameter used to calculate the one piece of fourth information is the same as the device parameter of the terminal.

In this manner, the terminal obtains the first information, the second information, the third information, and the fourth information that are solution information obtained in different calculation phases, and then selects, in a targeted manner based on the display scenario and the device parameter of the terminal, information that is closest to a final solution. Therefore, a calculation amount existing when the terminal calculates the final solution can be reduced as much as possible, and UI rendering efficiency can be improved.

With reference to any one of the fourth aspect and the possible implementations of the fourth aspect, in a seventh possible implementation of the fourth aspect, the constraint relationship grouped as the second type includes the constraint relationship of the M display scenarios, the constraint relationship of the N device parameters, and the constraint relationship of the P pieces of data generated during running; and the apparatus further includes: a sending unit configured to send description information to a server before the receiving unit receives a resource file, where the description information is used to describe a display scenario and the device parameter of the terminal, where if the terminal is not one of the M display scenarios and the device parameter of the terminal does not belong to one group of device parameters in the plurality of groups of device parameters, the resource file includes the first intermediate solution set, the constraint relationship of the N device parameters, and the constraint relationship of the P pieces of data generated during running; or if the server determines that the display scenario of the terminal is not one of the M display scenarios and the device parameter of the terminal belongs to one group of device parameters in the plurality of groups of device parameters, the resource file includes one piece of third information, the piece of third information includes solution information calculated based on the first intermediate solution set, the constraint relationship of the P pieces of data generated during running, the constraint relationship of the N device parameters, and the one group of device parameters, and the group of device parameters are the same as the device parameter of the terminal; or if the server determines that the display scenario of the terminal is one of the M display scenarios but the device parameter of the terminal does not belong to any one of the plurality of groups of device parameters, the resource file includes one second intermediate solution set and the constraint relationship of the N device parameters, and the one second intermediate solution set is a solution set calculated based on the first intermediate solution set, the constraint relationship of the P pieces of data generated during running, and the constraint relationship of the display scenario of the terminal; or if the server determines that the display scenario of the terminal is one of the M display scenarios and the device parameter of the terminal belongs to one group of device parameters in a plurality of groups of device parameters, the resource file includes one piece of fourth information, the one piece of fourth information includes solution information calculated based on the one second intermediate solution set, the constraint relationship of the N device parameters, and the one group of device parameters, and the constraint relationship of the device parameter is a constraint relationship of which the device parameter of the terminal needs to be used for solving.

In this manner, the terminal obtains the first information, the second information, the third information, and the fourth information that are solution information obtained in different calculation phases, and then selects, in a targeted manner based on the display scenario and the device parameter of the terminal, information that is closest to a final solution. Therefore, a calculation amount existing when the terminal calculates the final solution can be reduced as much as possible. In addition, the information that is closest to the final solution is selected by a device (for example, the IDE) other than the terminal. Therefore, the calculation amount of the terminal is further reduced, and UI rendering efficiency of the terminal can be improved.

According to a fifth aspect, an embodiment of the present disclosure provides an apparatus provided with an IDE. The apparatus includes a processor and a memory, the memory is configured to store a computer program, and the processor is configured to invoke the computer program to perform the method according to any one of the first aspect and the possible implementations of the first aspect.

According to a sixth aspect, an embodiment of the present disclosure provides a terminal. The terminal includes a processor and a memory. The memory is configured to store a computer program, and the processor is configured to invoke the computer program to perform the method according to any one of the second aspect and the possible implementations of the second aspect.

According to a seventh aspect, an embodiment of the present disclosure provides a computer-readable storage medium. The computer-readable storage medium stores a computer program. When the computer program runs on a processor, the method according to any one of the first aspect and the possible implementations of the first aspect is implemented, or the method according to any one of the second aspect and the possible implementations of the second aspect is implemented.

BRIEF DESCRIPTION OF DRAWINGS

The following describes accompanying drawings used in embodiments of the present disclosure.

DESCRIPTION OF EMBODIMENTS

Figure 1:
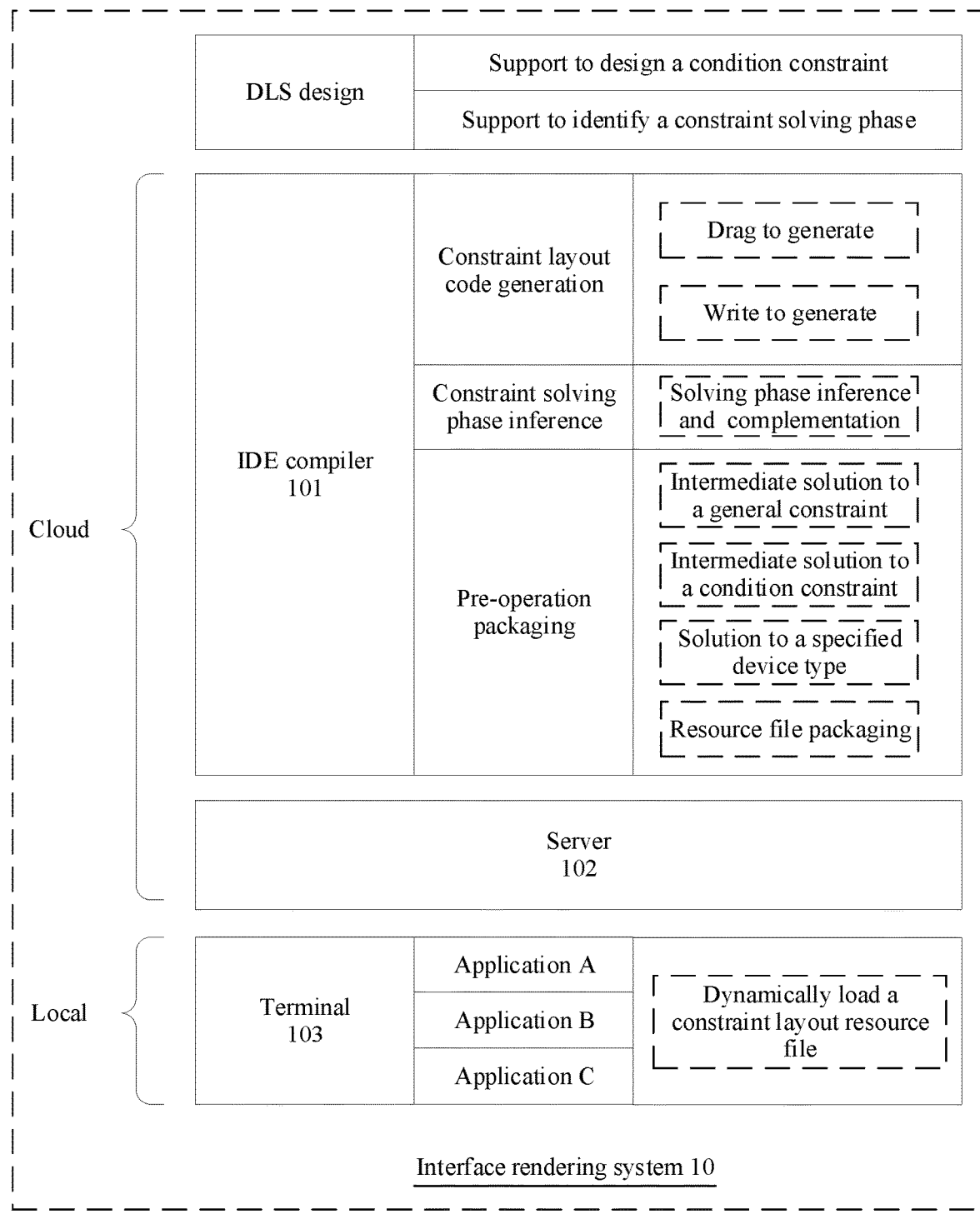
FIG. 1 is a schematic diagram of a structure of an image rendering system according to an embodiment of the present disclosure.

The following describes embodiments of the present disclosure with reference to the accompanying drawings in embodiments of the present disclosure.

A constraint layout is an implementation solution for solving an adaptive layout. The constraint layout is constructed by using a flexible constraint system. The constraint layout marks and describes a mutual location relationship between view components (components) by using a constraint relationship. For example, each constraint relationship indicates locations of a component and another component (for example, a parent component or a same-level component) or an invisible guideline, and blurs a limitation imposed by the display area. An optimal UI layout in the display area (or in a display interface) can be obtained by solving the constraint relationship, to greatly improve UI adaptability. The invisible guideline is a reference line in a UI, is an invisible line, and is used to measure a location of a component in the UI. Such a connection relationship reflects a relative location relationship.

Optionally, the layout mentioned in embodiments of the present disclosure reflects a location relationship between one or more of components in the UI or what includes one or more items that are display content.

In embodiments of the present disclosure, the constraint relationship includes a constraint relationship of a display scenario, a constraint relationship of which data of a terminal needs to be used for a solving process, and the like. Optionally, the constraint relationship may exist in a form of a system of equations.

Display scenarios may be usually grouped into a special-shaped screen scenario, a foldable-screen scenario, a landscape-mode display scenario, and a portrait-mode display scenario, and the like. The terminal may further have other display scenario. The other display scenarios are not described by using examples one by one. Usually, the constraint relationship of the display scenario includes some keywords related to the scenario, for example, words such as Vstack and Hstack. For ease of description, the keyword may be referred to as a first keyword. Usually, display scenarios of a same device in different time periods may be the same or may be different.

The data that is of the terminal and that needs to be used for the solving process may specifically include one or more of an inherent device parameter (for example, resolution, pixel density, or a screen refresh rate) of the terminal and data generated during running of the terminal (for example, data generated in a running process or data obtained (for example, downloaded) from another place in a running process). Usually, the constraint relationship of which the data of the terminal needs to be used for the solving process includes some keywords related to the data of the terminal.

For ease of description, the keyword may be referred to as a second keyword. For example, the constraint relationship of the data generated during running of the terminal may include a second keyword Bindo. Usually, device parameters of devices of different types may be different, and device parameters of devices of a same type may be the same.

Figure 2:
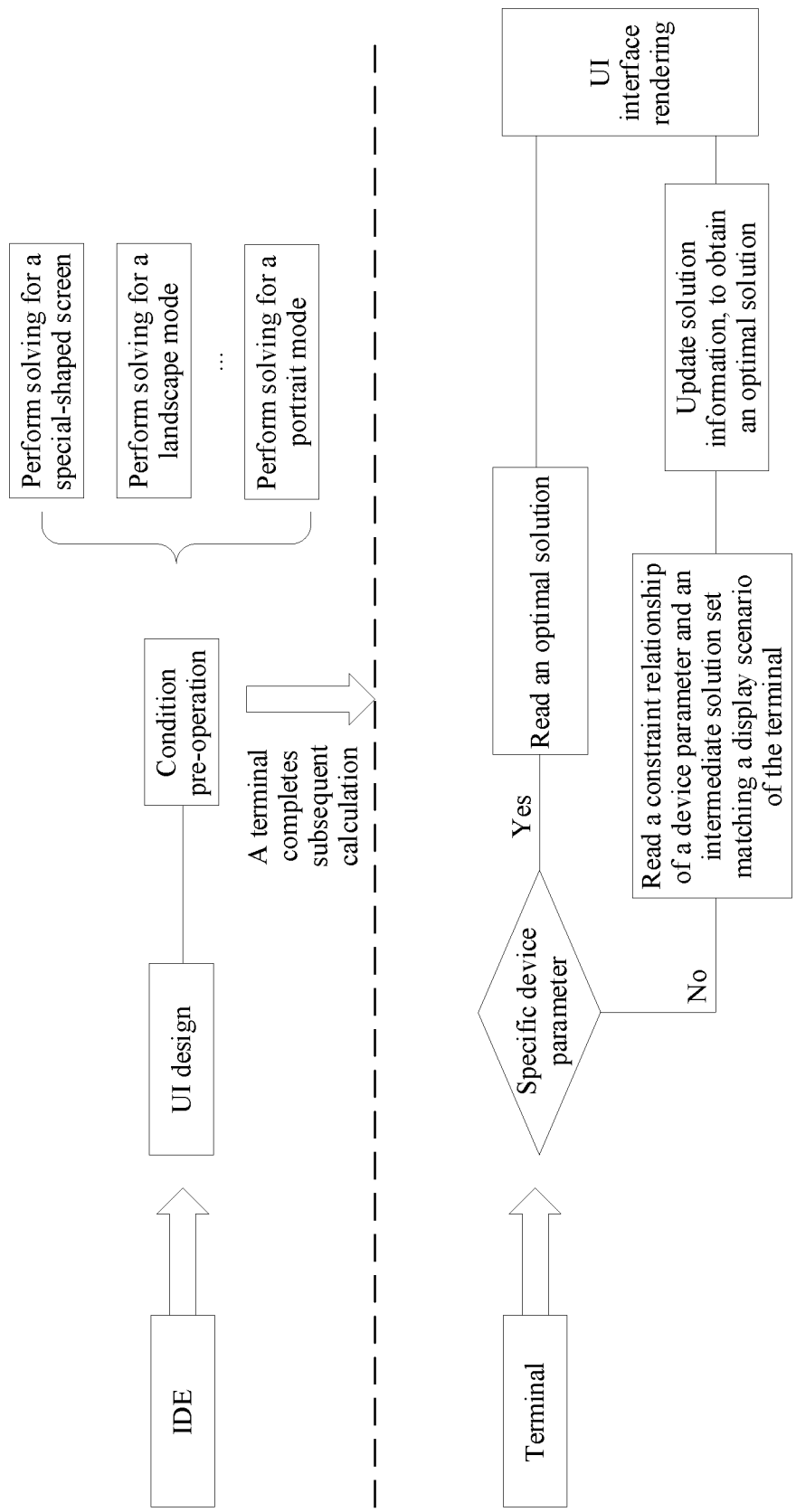
FIG. 2 is a schematic flowchart of a UI adaptation constraint solving method according to an embodiment of the present disclosure.

FIG. 1 is a schematic diagram of a structure of an image rendering system according to an embodiment of the present disclosure. The system includes an IDE 101, a server 102, and a terminal 103. FIG. 2 is a schematic flowchart of a UI constraint solving method according to an embodiment of the present disclosure. The method may be implemented based on the system shown in FIG. 1. The following describes parts in the system shown in FIG. 1 and a part of a procedure of the constraint solving method shown in FIG. 2.

An IDE 101 may be preconfigured, so that the IDE supports a design of a condition constraint relationship and supports to identify a type of the constraint relationship. For example, some constraint relationships are identified as a first type, and some other constraint relationships are identified as a second type. There is a difference between solving phases of constraint relationships of different types. Therefore, it may be considered that the solving phase of the constraint relationship is identified. Optionally, configuration of the IDE 101 may be completed based on a development suite of a domain-specific language (DSL) design.

After configuration, the IDE 101 is configured to complete generation of program code (also referred to as layout code) of the constraint relationship, inference and identification of the type of the constraint relationship, and solution pre-operation and solution information packaging of the constraint relationship. Generation of the layout code of the constraint relationship and inference and identification of the type of the constraint relationship correspond to a UI design phase shown in FIG. 2. Solution pre-operation and solution information packaging of the constraint relationship correspond to condition pre-operation shown in FIG. 2.

A manner of generating the layout code of the constraint relationship in the IDE 101 is not limited herein. The manner of generating the layout code of the constraint relationship may include a drag to generate manner. For example, the IDE displays some view components to a user, and a developer selects a specific view component by using a mouse and drags the view component to a corresponding location in a UI by using the mouse, so that the IDE generates layout code of a constraint relationship of the view component. The manner of generating the layout code of the constraint relationship may further include a write to generate manner. For example, the developer enters the layout code into the IDE by using a keyboard.

The IDE 101 supports grouping and identification of the type of the constraint relationship, for example, supports to group the constraint relationships into a first type and a second type. Syntax support for keywords (for example, compile and runtime) corresponding to the two types is provided in a syntax design. In this way, a compile or runtime label (or a compile or runtime keyword) may be added to a constraint relationship that is grouped as a type in the IDE 101. In this embodiment of the present disclosure, a constraint relationship of the first type (or a constraint relationship marked with the keyword compile) is a constraint relationship that needs to be solved in the IDE, instead of being solved in the terminal. A constraint relationship of the second type (or a constraint relationship marked with the keyword runtime) is allowed to be solved in the terminal. The constraint relationship of this type may be solved in the terminal or the IDE. Whether the constraint relationship of this type is finally solved in the terminal or the IDE depends on a specific situation. For example, if the terminal finds, based on a related condition (for example, a display scenario or a device parameter), that solution information required by the terminal has existed, the terminal may no longer need to perform solving based on the constraint relationship of the second type. If the terminal finds, based on the related condition, that the solution information required by the terminal does not exist, the terminal performs solving based on the constraint relationship of the second type.

In the present disclosure, obtained constraint relationships are grouped into the first type and the second type and identified, which may be automatically completed by the IDE, or may be manually completed by the developer, or may be completed by combining the IDE and the developer. For example, the IDE first performs preliminary inference and grouping based on a predefined rule (for example, performs inference and grouping by identifying a first keyword and a second keyword), and then the developer corrects or supplements a preliminary grouping result.

Solution pre-operation and solution information packaging that are of the constraint relationship and that are performed in the IDE 101 include two aspects. In one aspect, solution pre-operation of the constraint relationship is performed, and is mainly to perform solving based on the constraint relationship of the first type (that is, a constraint relationship marked as compile) to obtain a first intermediate solution set. The constraint relationship of the second type (that is, a constraint relationship marked as runtime) may be further substituted into the first intermediate solution set to obtain a second intermediate solution set, or data of the terminal may be further substituted into the first intermediate solution set or the second intermediate solution set to obtain an optimal solution that is to the constraint relationship and that is applicable to a specific display scenario or a specific device. In the other aspect, solution information packaging is performed, and is mainly to package solution information obtained through solution, for example, one or more of the first intermediate solution set, the second intermediate solution set, or the optimal solution to the constraint relationship.

The server 102 may be one server or a server cluster including a plurality of servers, and is mainly configured to store a file generated by the IDE, so that one or more terminals obtain (for example, download) the file. FIG. 1 shows one terminal 103. For a manner in which other terminals obtain the file from the server 102 and use the file, refer to descriptions of the terminal 103.

The terminal 103 is a device with a UI display requirement. For example, an application A, an application B, and an application C deployed on the terminal each have a UI display requirement. Therefore, specific locations of view components of these applications in a display area need to be determined by the terminal 103. In the present disclosure, the terminal may obtain, from the server 102, a resource file related to a constraint layout. For example, as shown in FIG. 2, if a device parameter of the terminal is a specific device parameter, the terminal may directly read, from the resource file, an optimal solution that is to the constraint relationship and that is calculated based on the specific device parameter. If the device parameter of the terminal is not a specific device parameter, the terminal reads, from the resource file, constraint relationships of a set of device parameters and an intermediate solution set (for example, the first intermediate solution set or the second intermediate solution set) matching a display scenario of the terminal, and then calculates one optimal solution to the constraint relationship with reference to information such as the device parameter of the terminal. It can be understood that an optimal solution that is to a UI layout and that is read or calculated by the terminal describes a location of each view component in the UI. Therefore, the terminal may render the UI based on the optimal solution.

It can be learned, based on the foregoing descriptions, that most of a plurality of constraint relationships of the UI are solved in the IDE, and a small part of constraint relationships may be solved (that is, calculated) by the terminal, to significantly reduce calculation pressure of the terminal.

It should be noted that, in an optional solution, the server 102 in FIG. 1 may not exist. In this case, the terminal 103 may directly obtain the foregoing corresponding file from the IDE without using the server 102.

It should be noted that, when the server 102 exists, the server 102 may be deployed on the cloud, and the IDE 101 may be deployed on the cloud, or may be deployed locally by the developer. FIG. 1 is a schematic diagram of an example in which both the IDE 101 and the server 102 are deployed on the cloud.

Figure 3:
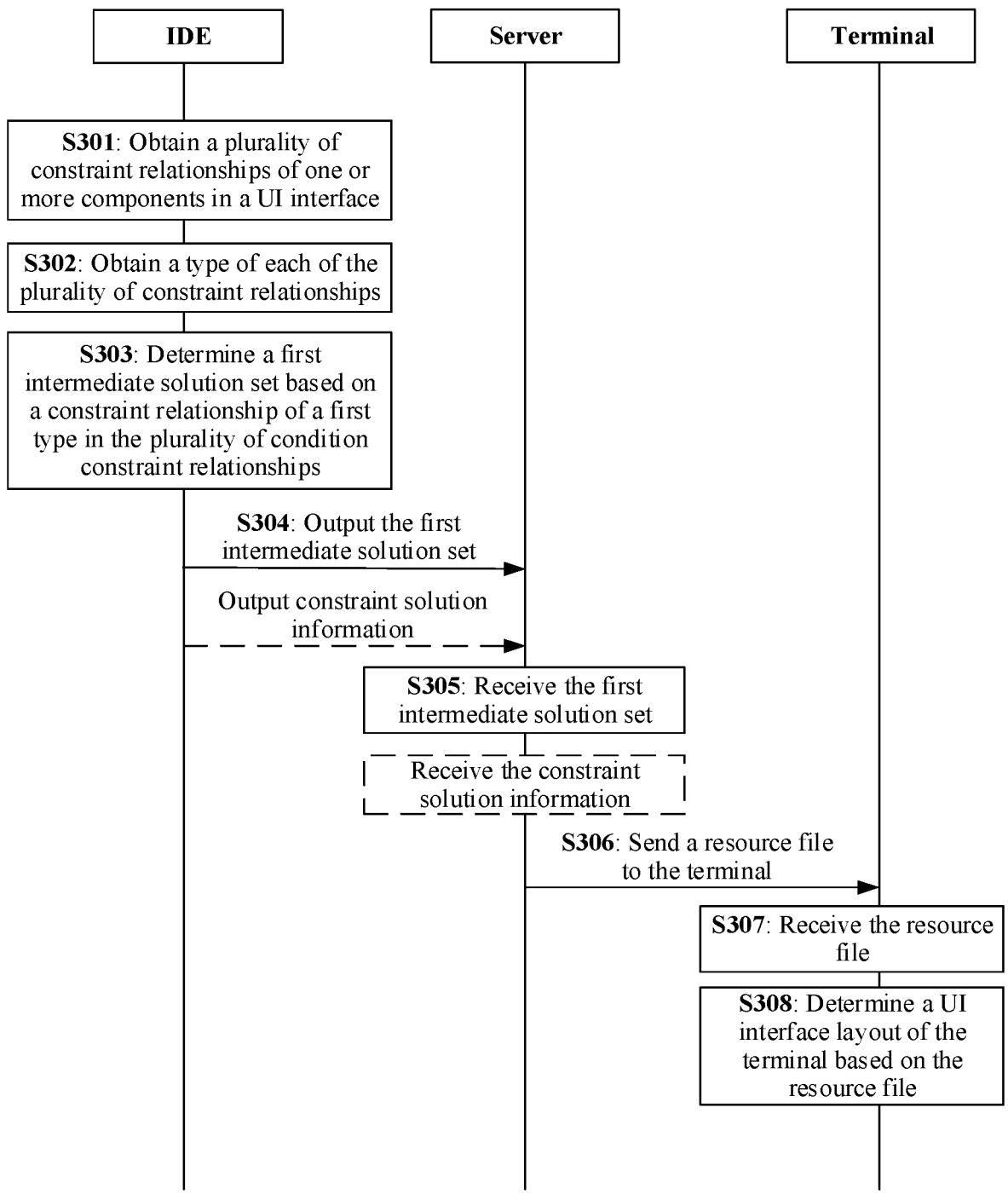
FIG. 3 is a schematic flowchart of a UI adaptation solving method according to an embodiment of the present disclosure.

FIG. 3 shows a UI adaptation solving method according to an embodiment of the present disclosure. Related descriptions of the method are more detailed than related descriptions of the method shown in FIG. 2. The method may be implemented based on a system architecture shown in FIG. 1 or another system architecture. The method includes but is not limited to the following steps.

Step S301: An IDE obtains a plurality of constraint relationships of one or more components in a UI.

Specifically, the IDE may respond to an input operation performed by a user, to obtain the plurality of constraint relationships of the UI.

In an optional solution, the input operation includes a drag operation and/or a write operation. In this case, that the IDE responds to an input operation performed by a user includes: The IDE responds to the drag operation and/or the write operation performed by the user.

Figure 4:
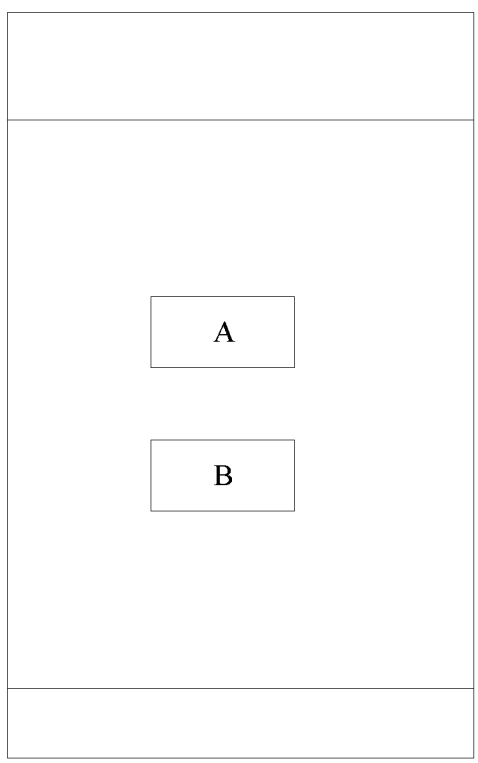
FIG. 4 is a schematic diagram of a scenario of a component in a UI according to an embodiment of the present disclosure.
Figure 4:
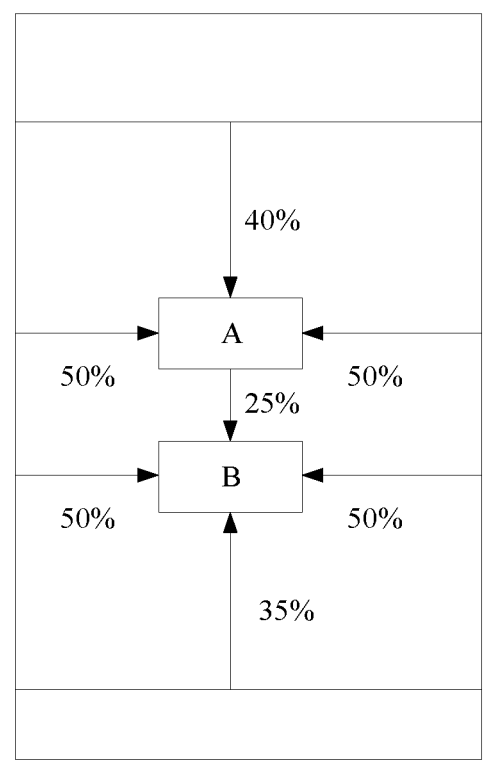

The drag operation is performed to drag the one or more components to a specific location, and the plurality of constraint relationships are related to a location of the one or more components on a screen. For example, as shown in a part (a) in FIG. 4, after a view component A and a view component B are dragged to specific locations by performing the drag operation, as shown in a part (b) in FIG. 4, the IDE automatically determines the locations of the view component A and the view component B relative to a display boundary of a display interface or another view component (shown by a percentage of a length or a width of the display interface in FIG. 4). A description of such a relative location is a constraint relationship, and may be represented in a form of code in the IDE.

The write operation is performed to write the constraint relationship. For example, the user enters a character into an editing area of the constraint relationship by tapping a keyboard. After entering some characters, a constraint relationship may be obtained.

It can be understood that, after the user (the user in this step is a developer) performs the input operation for a plurality of times, the plurality of constraint relationships of the UI may be obtained. Each constraint relationship is used to describe a layout of one or more components in a UI of a terminal. Therefore, the plurality of constraint relationships can be used to determine the layout of the one or more components in the UI.

Step S302: The IDE obtains a type of each of the plurality of constraint relationships.

In an optional solution, the IDE infers types of the plurality of constraint relationships based on a preset rule. For example, a constraint relationship of a display scenario is grouped as a second type, a constraint relationship of which data of the terminal needs to be used for a solving process is grouped as the second type, and a remaining constraint relationship is grouped as a first type. Optionally, the constraint relationship of the display scenario is specifically a constraint relationship affected by the display scenario. For example, a constraint relationship of a landscape-mode display scenario is specifically a constraint relationship affected by the landscape-mode display scenario, and a constraint relationship of a portrait-mode display scenario is specifically a constraint relationship affected by the portrait-mode display scenario. The constraint relationship of the display scenario includes some keywords related to the scenario, for example, words such as Vstack and Hstack. For ease of description, the keyword may be referred to as a first keyword. A constraint relationship of which data of a terminal side needs to be used for a solving process includes some keywords related to the data of the terminal. For ease of description, the keyword may be referred to as a second keyword. For example, a constraint relationship of data generated during running of the terminal may include a second keyword Bindo.

Therefore, that the IDE infers types of the plurality of constraint relationships based on a preset rule may be specifically as follows: A constraint relationship marked with the first keyword (for example, the words such as Vstack and Hstack in an annotation) is grouped as the second type, and the constraint relationship marked with the first keyword is the constraint relationship of the display scenario; and a constraint relationship marked with a second keyword (for example, a Bindo function) is grouped as the second type, and the constraint relationship marked with the second keyword is a constraint relationship of which the data of the terminal needs to be used for a solving process. A constraint relationship that is marked with neither the first keyword nor the second keyword is grouped as the first type.

In another optional solution, the user (for example, the developer) may mark each of the plurality of constraint relationships, to group the plurality of constraint relationships into the first type and the second type.

In another optional solution, the IDE first infers the types of the plurality of constraint relationships based on the preset rule, to obtain a preliminary grouping result, and then the user (for example, the developer) corrects the preliminarily obtained grouping result. For example, the IDE corrects, based on a selection operation entered by the user, the types inferred by the IDE, to determine a constraint relationship of the first type and a constraint relationship of the second type in the plurality of constraint relationships.

Optionally, after obtaining the type of each of the plurality of constraint relationships, the IDE may display the type of each constraint relationship, for example, display a label of the type of each constraint relationship behind the constraint relationship.

In this embodiment of the present disclosure, the display scenario may be a display scenario such as a special-shaped screen scenario (for example, a notch screen), a foldable-screen scenario, a landscape-mode display scenario, or a portrait-mode display scenario. A constraint relationship of each display scenario is valid only in the display scenario.

In this embodiment of the present disclosure, the data that is of the terminal and that needs to be used for the solving process may specifically include one or more of an inherent device parameter (for example, resolution, pixel density, or a screen refresh rate) of the terminal and the data generated during running of the terminal (for example, data generated in a running process or data obtained (for example, downloaded) from another place in a running process). Different device types usually correspond to different device parameters, for example, different resolution, pixel density, or screen refresh rates.

In addition, when the types of the plurality of constraint relationships are determined, the types of the plurality of constraint relationships may be determined together after the plurality of constraint relationships are obtained, or a type of a constraint relationship may be determined each time the constraint relationship is obtained.

For ease of understanding, a generated constraint relationship and a type of the constraint relationship are illustrated below by using an example from a perspective of code.

div_9.left+div_9.width−div_10.left+50==0, compile
div_10.left+div_10.width+100==div_2.left, compile
div_13.left+div_13.width+100==div_2.left, compile
div_7.left+div_7.width+100==Bind(div_2.left), runtime
div_8.left+div_8.width−Bind(div_6.left)+50>0, runtime
If Vstack:
   div_13.left+div 13.width+100==div 2.left, runtime
If Hstack:
   div_13.left+div 13.width+200==div 2.left, runtime
If DisplayCutout:
   div 13.left+div 13.width+50==div 2.left, runtime In the foregoing code, Bind() is a data binding function, a parameter used during running of the terminal needs to be introduced to solve Bind(), and "Bind" in Bind() may be used as the second keyword. When the developer writes (or drags to generate) the constraint relationship, a determining function is generated, and is used to determine a type of the display scenario. For example, If Vstack is a determining function, and indicates "if the display scenario is a portrait-mode display scenario", and Vstack in If Vstack may be the first keyword. For another example, If Hstack is a determining function, and indicates "if the display scenario is a landscape-mode display scenario", and Hstack in If Hstack may be the first keyword. For still another example, If DisplayCutout is a determining function, and indicates "if the display scenario is a landscape-mode display scenario", and DisplayCutout in If DisplayCutout may be the first keyword.

It can be learned from the foregoing code that the type of each constraint relationship may be represented by a keyword (or an identifier or a label) added behind the constraint relationship. Herein, compile represents the first type, and runtime represents the second type.

In this embodiment of the present disclosure, the constraint relationship of the first type (or a constraint relationship marked with the keyword compile) is solved in the IDE, instead of being solved in the terminal. The constraint relationship of the second type (or a constraint relationship marked with the keyword runtime) is allowed to be solved in the terminal. The constraint relationship of this type may be solved in the terminal or the IDE. Whether the constraint relationship of this type is finally solved in the terminal or the IDE depends on a specific situation. For example, if the terminal finds, based on a related condition (for example, a display scenario or a device parameter), that solution information required by the terminal has existed, the terminal may no longer need to perform solving based on the constraint relationship of the second type. If the terminal finds, based on the related condition, that the solution information required by the terminal does not exist, the terminal performs solving based on the constraint relationship of the second type. Detailed descriptions are provided below.

For ease of subsequent description, it may be assumed that the second type obtained through grouping includes a constraint relationship of M display scenarios, a constraint relationship of N device parameters, and a constraint relationship of P pieces of data generated during running, where M, N, and P each are a positive integer.

Step S303: The IDE calculates a first intermediate solution set based on the constraint relationship of the first type in the plurality of condition constraint relationships.

It can be understood that the constraint relationship of the first type is only a part of the plurality of constraint relationships, and neither a special display scenario nor the data of the terminal is considered. Therefore, a preliminary solution may be obtained based on the constraint relationship of the first type, but a final solution cannot be obtained temporarily. Therefore, the preliminary solution obtained based on the constraint relationship of the first type is referred to as the first intermediate solution set herein for ease of subsequent description. Compared with the constraint relationship of the first type, the first intermediate solution set can more intuitively and briefly reflect a layout of a view component in a display area.

Step S304: The IDE outputs the first intermediate solution set.

Specifically, the IDE may directly send the first intermediate solution set to the terminal, or may indirectly send the first intermediate solution set to the terminal. For example, the IDE sends the first intermediate solution set to an intermediate device, for example, a server, and then the server sends the first intermediate solution set to the terminal.

The first intermediate solution set is specifically used by the terminal to further calculate the final solution to the constraint relationship with reference to other information. The final solution to the constraint relationship can most accurately describe a layout of the components in the UI in the display area.

Optionally, the other information may include the constraint relationship of the N device parameters and the constraint relationship of the P pieces of data generated during running, and the other information may be directly or indirectly sent by the IDE to the terminal.

Optionally, the first intermediate solution set, the constraint relationship of the N device parameters, and the constraint relationship of the P pieces of data generated during running may be packaged together and sent to the terminal. Packaged data may be referred to as first information for ease of subsequent description.

In this embodiment of the present disclosure, optionally, the IDE may further calculate and output constraint solution information. The constraint solution information is solution information calculated based on the first intermediate solution set and the constraint relationship of the second type.

For example, the calculating constraint solution information may include:

The IDE calculates M second intermediate solution sets based on the first intermediate solution set, the constraint relationship of the P pieces of data generated during running, and the constraint relationship of the M display scenarios. Different constraint relationships of display scenarios are used to calculate different second intermediate solution sets. For example, if M is equal to 2, to be specific, two constraint relationships of display scenarios exist, and are respectively the constraint relationship of the landscape-mode display scenario and the constraint relationship of the portrait-mode display scenario, the IDE calculates one second intermediate solution set based on the first intermediate solution set, the constraint relationship of the P pieces of data generated during running, and the constraint relationship of the landscape-mode display scenario, and calculates another second intermediate solution set based on the first intermediate solution set, the constraint relationship of the P pieces of data generated during running, and the constraint relationship of the portrait-mode display scenario. That is, the two second intermediate solution sets are obtained: One is used for the landscape-mode display scenario, and the other is used for the portrait-mode display scenario. Optionally, when a corresponding second intermediate solution set is calculated based on a constraint relationship of a specific display scenario, a process of the calculation may include: Because the data generated during running needs to be used when the constraint relationship of the P pieces of data generated during running participates in calculation, the IDE combines a default value of the data generated during running, the constraint relationship of the P pieces of data generated during running, the first intermediate solution set, and the constraint relationship of the specific display scenario for solving, to obtain a second intermediate solution set corresponding to the display scenario.

It can be understood that, compared with the first intermediate solution set, the second intermediate solution set can more accurately reflect the layout of the view component in the display area. The constraint solution information includes at least second information. The second information includes the M second intermediate solution sets and the constraint relationship of the N device parameters. In other words, the constraint solution information includes the second information.

For another example, the calculating constraint solution information may include:

The IDE calculates one or more pieces of third information based on the first intermediate solution set, the constraint relationship of the P pieces of data generated during running, the constraint relationship of the N device parameters, and one or more groups of device parameters. Different third information is calculated based on different device parameters. For example, if the plurality of groups of device parameters are specifically two groups of device parameters, one group is a device parameter of a Huawei P40 mobile phone, and one group is a device parameter of an Apple iPhone 12 mobile phone, the IDE calculates one piece of third information based on the first intermediate solution set, the constraint relationship of the P pieces of data generated during running, the constraint relationship of the N device parameters, and the one group of device parameters of the Huawei P40 mobile phone, and the IDE further calculates one piece of third information based on the first intermediate solution set, the constraint relationship of the P pieces of data generated during running, the constraint relationship of the N device parameters, and the one group of device parameters of the Apple iPhone 12 mobile phone. A total of two pieces of third information are obtained: One piece of third information is applicable to Huawei P40, and the other piece of third information is applicable to Apple iPhone 12. For example, the calculating one piece of third information based on the first intermediate solution set, the constraint relationship of the P pieces of data generated during running, the constraint relationship of the N device parameters, and the one group of device parameters of the Apple iPhone 12 mobile phone may specifically include: substituting the one group of device parameters of the Apple iPhone 12 mobile phone into the constraint relationship of the N device parameters for solving, to obtain an intermediate constraint. In addition, because the data generated during running needs to be used when the constraint relationship of the P pieces of data generated during running participates in calculation, the default value of the data generated during running, the constraint relationship of the P pieces of data generated during running, the first intermediate solution set, and the intermediate constraint are combined for solving, to obtain the one piece of third information corresponding to the Apple iPhone 12 mobile phone.

The constraint solution information includes at least the one or more pieces of third information.

For another example, the calculating constraint solution information may include:

The IDE calculates one or more pieces of fourth information based on the constraint relationship of the P pieces of data generated during running, the M second intermediate solution sets, the constraint relationship of the N device parameters, and the one or more groups of device parameters. Different fourth information is calculated based on different second intermediate solution sets or device parameters. With reference to the foregoing explanations of the second information and the third information, it can be learned that, a change of the display scenario and a change of the device parameter each may cause a change of a solution result. Therefore, specific fourth information is calculated for a specific display scenario and a specific device parameter. For example, if the display scenario includes landscape-mode display and portrait-mode display, two second intermediate solution sets are calculated. If the device parameter includes a device parameter of the Huawei P40 mobile phone and a device parameter of the Apple iPhone 12 mobile phone, four pieces of fourth information may be calculated in the foregoing manner. One piece of fourth information is used to constrain a component in a UI of the Huawei P40 mobile phone in a landscape mode, one piece of fourth information is used to constrain the component in the UI of the Huawei P40 mobile phone in a portrait mode, one piece of fourth information is used to constrain a component in a UI of the Apple iPhone 12 mobile phone in a landscape mode, and one piece of fourth information is used to constrain the component in the UI of the Apple iPhone 12 mobile phone in a portrait mode.

Optionally, a fourth information corresponding to a landscape-mode display scenario of the Apple iPhone 12 mobile phone is used as an example. A calculation process may be as follows: Because the data generated during running needs to be used when the constraint relationship of the P pieces of data generated during running participates in calculation, the default value of the data generated during running, the constraint relationship of the P pieces of data generated during running, the constraint relationship of the landscape-mode display scenario, and the first intermediate solution set are combined for solving, to obtain a second intermediate solution set, the device parameter of the Apple iPhone 12 mobile phone is substituted into the constraint relationship of the N device parameters for solving, to obtain an intermediate constraint, and then the second intermediate solution set and the intermediate constraint are combined for solving, to obtain the fourth information corresponding to the landscape-mode display scenario of the Apple iPhone 12 mobile phone. A calculation process of other fourth information is similar.

The constraint solution information includes at least the one or more pieces of fourth information.

Optionally, the constraint solution information may specifically include one or more of the second information, the one or more pieces of third information, and the one or more pieces of fourth information.

Step S305: The server receives the first intermediate solution set sent by the IDE.

In addition, the server may further receive the constraint relationship of the N device parameters and the constraint relationship of the P pieces of data generated during running. For example, the server receives the first information.

The server may further receive the one or more of the second information, the one or more pieces of third information, and the one or more pieces of fourth information.

For ease of understanding, the following provides descriptions by using an example in which the server receives the first information, the second information, the one or more pieces of third information, and the one or more pieces of fourth information that are sent by the IDE.

The server may be a single server, or may be a server cluster including a plurality of servers. The server is configured to store a resource file received from the IDE, so that the terminal obtains the resource file, for example, downloads the resource file.

Optionally, the server may be deployed on the cloud, so that the terminal connected to the Internet obtains the resource file from the server.

Step S306: The server sends the resource file to the terminal.

The terminal may actively send an obtaining request to the server, and the server sends the resource file to the terminal in response to the request; or the server may actively send the resource file to the terminal at a scheduled time point or when a preset condition is met.

In this embodiment of the present disclosure, the resource file includes at least one of the first intermediate solution set and the constraint solution information. More specifically, if the constraint solution information includes the second information, the one or more pieces of third information, and the one or more pieces of fourth information, the resource file may include one or more of the first information, the second information, the one or more pieces of third information, and the one or more pieces of fourth information.

For ease of understanding, the following provides examples of two optional cases of the resource file.

Case 1: The server determines a display scenario and a device parameter of the terminal, to send, to the terminal in a targeted manner, information required by an interface layout, that is, the resource file. An implementation process of this case is as follows:

The server receives description information sent by the terminal device. The description information describes the device parameter of the terminal and a current display scenario, for example, landscape-mode display, portrait-mode display, or special-shaped screen display.

If the description information indicates that the display scenario of the terminal is not one of the M display scenarios and the device parameter of the terminal does not belong to one group of device parameters in the plurality of groups of device parameters, the resource file sent by the server to the terminal includes the first intermediate solution set, the constraint relationship of the N device parameters, and the constraint relationship of the P pieces of data generated during running. That is, the resource file includes the first information.

If the description information indicates that the display scenario of the terminal is not one of the M display scenarios and the device parameter of the terminal belongs to one group of device parameters in the plurality of groups of device parameters, the resource file sent by the server to the terminal includes one piece of third information, the piece of third information includes solution information calculated based on the first intermediate solution set, the constraint relationship of the P pieces of data generated during running, the constraint relationship of the N device parameters, and the one group of device parameters, and the group of device parameters are the same as the device parameter of the terminal.

If the description information indicates that the display scenario of the terminal is one of the M display scenarios but the device parameter of the terminal does not belong to any one of the plurality of groups of device parameters, the resource file sent by the server to the terminal includes one second intermediate solution set and the constraint relationship of the N device parameters, that is, includes some content of the second information, the one second intermediate solution set is a solution set calculated based on the first intermediate solution set, the constraint relationship of the P pieces of data generated during running, and a constraint relationship of one display scenario in the M display scenarios, and the one display scenario is the same as the display scenario of the terminal.

If the description information indicates that the display scenario of the terminal is one of the M display scenarios and the device parameter of the terminal belongs to one group of device parameters in a plurality of groups of device parameters, the resource file sent by the server to the terminal includes one piece of fourth information, and the one piece of fourth information includes solution information calculated based on the one second intermediate solution set, the constraint relationship of the N device parameters, and the one group of device parameters. It can be understood that the one second intermediate solution set is calculated based on the constraint relationship of the display scenario of the terminal herein, and the one group of device parameters is the same as the device parameter of the terminal.

An idea of Case 1 is that the server selects, in a targeted manner for the terminal based on a case of the display scenario, the device parameter, and the like of the terminal, solution information used for a UI layout, and sends the selected solution information to the terminal.

Case 2: The resource file sent by the server to the terminal includes a plurality of types of information related to an interface layout, for example, includes at least two of the first information, the second information, the one or more pieces of third information, and the one or more pieces of fourth information. For ease of description, the following provides descriptions by using an example in which the resource file includes the first information, the second information, the one or more pieces of third information, and the one or more pieces of fourth information. After receiving the resource file, the terminal selects, based on the display scenario and the device parameter of the terminal, information that is about the interface layout and that is applicable to the terminal.

Step S307: The terminal receives the resource file sent by the server.

Step S308: The terminal determines the UI layout of the terminal based on the resource file.

For Case 1, the resource file is layout information applicable to the terminal. Therefore, the terminal may directly determine the UI layout of the terminal based on the resource file.

For example, if the resource file includes the first information, to be specific, includes the first intermediate solution set, the constraint relationship of the N device parameters, and the constraint relationship of the P pieces of data generated during running, the terminal may substitute the device parameter of the terminal into the constraint relationship of the N device parameters for solving, to obtain an intermediate constraint. In addition, because the data generated during running needs to be used when the constraint relationship of the P pieces of data generated during running participates in calculation, the first intermediate solution set, the intermediate constraint, the default value of the data generated during the running of the terminal, and the constraint relationship of the P pieces of data generated during the running are combined for solving, to obtain the final solution to the constraint relationship. The final solution can more accurately reflect the layout of the view component in the display area of the UI. Therefore, the terminal may render the UI based on the final solution.

For another example, if the resource file includes one second intermediate solution set in the second information and the constraint relationship of the N device parameters, the terminal substitutes the device parameter of the terminal into the constraint relationship of the N device parameters for solving, to obtain an intermediate constraint, and then combines the second intermediate solution set and the intermediate constraint for solving, to obtain a final solution to the constraint relationship. The final solution can more accurately reflect the layout of the view components in the display area of the UI. Therefore, the terminal may render the UI based on the final solution.

For another example, if the resource file includes one piece of third information in the one or more pieces of third information, because the one piece of third information is calculated based on the device parameter of the terminal, the one piece of third information is an optimal solution to the constraint relationship of the UI of the terminal. The final solution can more accurately reflect the layout of the view component in the display area of the UI. Therefore, the terminal may render the UI based on the final solution.

For another example, if the resource file includes one piece of fourth information in the one or more pieces of fourth information, because the one piece of fourth information is calculated based on the device parameter of the terminal and the display scenario of the terminal, the one piece of fourth information is an optimal solution to the constraint relationship of the UI of the terminal. The final solution can more accurately reflect the layout of the view component in the display area of the UI. Therefore, the terminal may render the UI based on the final solution.

In an optional solution, if the terminal has a real value of the data generated during running after running for a period of time, the real value of the data generated during running may be substituted into the final solution to update the optimal solution. This process may be considered as replacing the default value of the data generated during running with the real value of the data generated during running. After the optimal solution is updated, rendering may be performed again based on the updated optimal solution, to improve a UI rendering effect.

Figure 5:
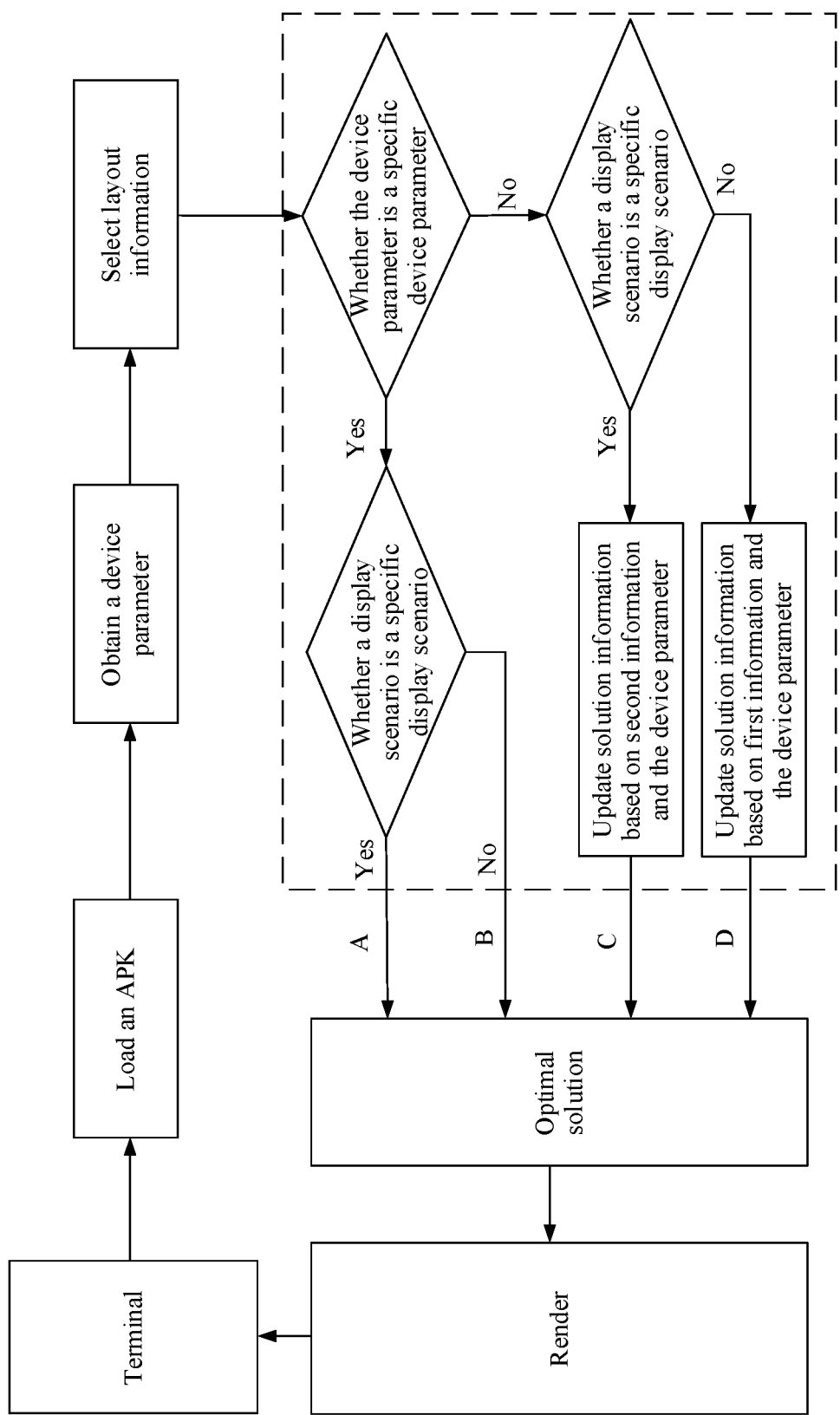
FIG. 5 is a schematic flowchart of a UI adaptation solving method according to an embodiment of the present disclosure.

For Case 2, the resource file includes too much information, and includes both layout information applicable to the terminal and layout information not applicable to the terminal. Therefore, the terminal needs to select, based on the display scenario and the device parameter of the terminal, the layout information applicable to the terminal, and then determines the UI layout of the terminal based on the layout information applicable to the terminal. For example, as shown in FIG. 5, the terminal loads an Android Package Kit (APK) file. The APK file includes the resource file. In addition, the terminal further reads the device parameter of the terminal, where the device parameter may include resolution, pixel density, screen refresh rate, and other device attribute information of the terminal, and then selects required layout information from the original resource file based on the read device parameter. A process of selecting the required layout information is shown in a dashed box in FIG. 5.

If the display scenario of the terminal is not one of the M display scenarios and the device parameter of the terminal does not belong to one of the plurality of groups of device parameters, the layout information selected from the resource file includes the first information, to be specific, includes the first intermediate solution set, the constraint relationship of the N device parameters, and the constraint relationship of the P pieces of data generated during running.

Then, the terminal may substitute the device parameter of the terminal into the constraint relationship of the N device parameters for solving, to obtain an intermediate constraint. In addition, because the data generated during running needs to be used when the constraint relationship of the P pieces of data generated during running participates in calculation, the terminal combines the first intermediate solution set, the intermediate constraint, the default value of the data generated during the running of the terminal, and the constraint relationship of the P pieces of data generated during the running for solving, to obtain the final solution to the constraint relationship. The final solution can more accurately reflect the layout of the view component in the display area of the UI. Therefore, the terminal may render the UI based on the final solution. This case corresponds to a procedure D in FIG. 5.

If the display scenario of the terminal is not one of the M display scenarios and the device parameter of the terminal belongs to one group of device parameters in the plurality of groups of device parameters, the layout information selected by the terminal from the resource file includes one piece of third information, and a device parameter used to calculate the one piece of third information is the same as the device parameter of the terminal. Because the device parameter used to calculate the one piece of third information is the same as the device parameter of the terminal, the one piece of third information is an optimal solution to the constraint relationship of the UI of the terminal. The final solution can more accurately reflect the layout of the view component in the display area of the UI. Therefore, the terminal may render the UI based on the final solution. This case corresponds to a procedure B in FIG. 5.

If the display scenario of the terminal is one of the M display scenarios but the device parameter of the terminal does not belong to any one of the plurality of groups of device parameters, the layout information selected by the terminal from the resource file includes one second intermediate solution set in the second information and the constraint relationship of the N device parameters. A constraint relationship of a target display scenario is used to calculate the second intermediate solution set, and the target display scenario is the same as the display scenario of the terminal (in other words, the constraint relationship of the display scenario of the terminal is used to calculate the second intermediate solution set). Then, the terminal substitutes the device parameter of the terminal into the constraint relationship of the N device parameters for solving, to obtain an intermediate constraint, and then combines the second intermediate solution set and the intermediate constraint for solving, to obtain a final solution to the constraint relationship. The final solution can more accurately reflect the layout of the view components in the display area of the UI. Therefore, the terminal may render the UI based on the final solution. This case corresponds to a procedure C in FIG. 5.

If the display scenario of the terminal is one of the M display scenarios and the device parameter of the terminal belongs to one group of device parameters in the plurality of groups of device parameters, the layout information selected by the terminal from the resource file includes one piece of fourth information in the plurality of pieces of fourth information. A second intermediate solution set used to calculate the one piece of fourth information is calculated based on a constraint relationship of a target display scenario (that is, the display scenario of the terminal), and a device parameter used to calculate the one piece of fourth information is the same as the device parameter of the terminal. Because the one piece of fourth information is calculated based on the device parameter of the terminal and the display scenario of the terminal, the one piece of fourth information is an optimal solution to the constraint relationship of the UI of the terminal. The final solution can more accurately reflect the layout of the view component in the display area of the UI. Therefore, the terminal may render the UI based on the final solution. This case corresponds to a procedure A in FIG. 5.

Figure 6:
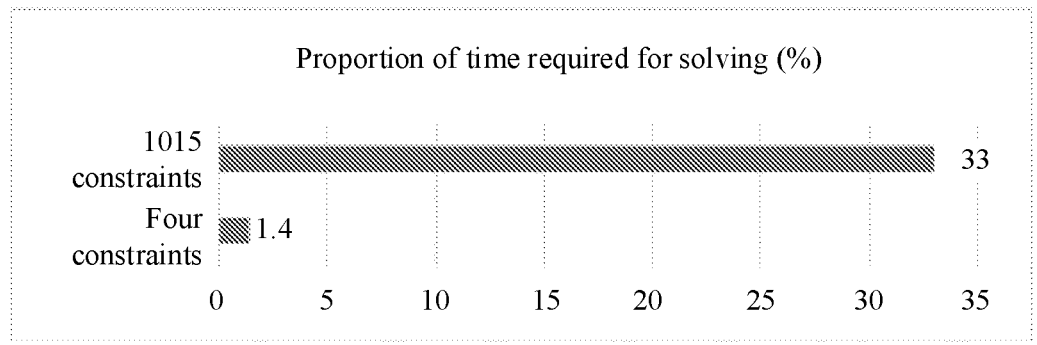
FIG. 6 is a schematic diagram of a time-consuming relationship of solving a constraint according to an embodiment of the present disclosure.

In the present disclosure, it is found from experimental data that when all solving processes of constraint relationships are implemented in the terminal, a proportion of the solving processes of the constraint relationship to an entire rendering process increases gradually as complexity of the constraint relationship increases. As shown in FIG. 6, it takes only 0.02 milliseconds (ms) to solve four constraint relationships, and a proportion to consumed time of the rendering process is 1.4%. However, it takes 13.67 ms to solve 1015 constraint relationships, and a proportion to the consumed time of the rendering process also increases to 33%.

An effect comparison between a case in which all or some solving processes of constraint relationships are completed in the IDE and a case in which all solving processes of constraint relationships are completed in the terminal is shown in Table 1:

TABLE 1

| Implementation | Consumed time (Average value of 500000 times) |
|---|---|
| All solving processes of constraint relationships are completed in a terminal (in the conventional technology) | 4.06778935 ms |
| All or some solving processes of constraint relationships are completed in an IDE (in the present disclosure) | 1.276350074 ms |

As shown in Table 1, in the conventional technology, it takes 4.06778935 ms to complete solving of 92 constraint relationships in the terminal. However, in the present disclosure, most operations of the 92 constraint relationships are completed in the IDE, the terminal consumes only 1.276350074 ms, and consumed time of the solving process is only 31.4% of that in the conventional technology. Therefore, in this embodiment of the present disclosure, time consumed by the terminal for solving is significantly shortened, and therefore, UI rendering efficiency of the terminal can be obviously improved.

In the method described in FIG. 3, a plurality of constraint relationships in the UI are grouped into the first type and the second type, the constraint relationship of the first type is set to be solved in the IDE, and the constraint relationship of the second type is allowed to be solved in the terminal. Based on this mechanism, most solving operations can be basically completed in the IDE, to significantly reduce calculation pressure existing when the terminal renders the UI, and improve UI rendering efficiency.

The foregoing describes the method in embodiments of the present disclosure in detail, and the following provides an apparatus in embodiments of the present disclosure.

Figure 7:
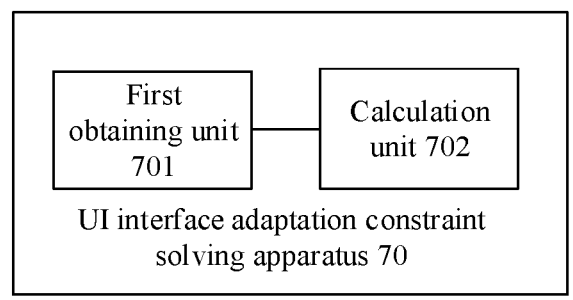
FIG. 7 is a schematic diagram of a structure of a UI adaptation solving apparatus according to an embodiment of the present disclosure.

FIG. 7 is a schematic diagram of a structure of a UI adaptation constraint solving apparatus 70 according to an embodiment of the present disclosure. The apparatus 70 may be the foregoing IDE or a component in the IDE. The apparatus 70 may include a first obtaining unit 701 and a calculation unit 702. The units are described in detail as follows:

The first obtaining unit 701 obtains a plurality of constraint relationships in a user interface UI. The plurality of constraint relationships are used to determine a layout of one or more components in the UI.

The calculation unit 702 is configured to calculate a first intermediate solution set based on a constraint relationship of a first type in the plurality of constraint relationships. The constraint relationship of the first type is a constraint relationship solved in an IDE, the first intermediate solution set is used to determine the layout of the one or more components in the UI together with a constraint relationship of a second type in the plurality of constraint relationships, and the constraint relationship of the second type is a constraint relationship solved in a terminal or the IDE.

In the method, a plurality of constraint relationships in the UI are grouped into the first type and the second type, the constraint relationship of the first type is set to be solved in the IDE, and the constraint relationship of the second type is allowed to be solved in the terminal. Based on this mechanism, most solving operations can be basically completed in the IDE, to significantly reduce calculation pressure existing when the terminal renders the UI, and improve UI rendering efficiency.

In an optional solution, the constraint relationship of the second type includes a constraint relationship related to a display scenario, or the constraint relationship of the second type includes a constraint relationship of which data of the terminal needs to be used for a solving process. Optionally, the constraint relationship of the second type is identified based on a keyword in each constraint relationship. The keyword indicates that the constraint relationship is a constraint relationship related to the display scenario or a constraint relationship of which the data of the terminal needs to be used for a solving process. In addition, a constraint relationship including no keyword is a constraint relationship of the first type.

In an optional solution, a manner of obtaining the constraint relationship of the second type through grouping may be specifically as follows: a constraint relationship marked with a first keyword (for example, words such as Vstack and Hstack in an annotation) is grouped as the second type, and the constraint relationship marked with the first keyword is a constraint relationship of a display scenario; and a constraint relationship marked with a second keyword (for example, a Bindo function) is grouped as the second type, and the constraint relationship marked with the second keyword is constraint relationship of which data of the terminal needs to be used for a solving process.

It can be understood that, because different terminals usually have different display scenarios and different device parameters, a constraint relationship of a specific display scenario or a specific group of device parameters are not applicable to all terminals. Therefore, a constraint relationship of a display scenario and a constraint relationship of which the data of the terminal needs to be used for a solving process are grouped as the second type, to conveniently perform a differentiated operation, so that layout information required by different terminals can be determined in a targeted manner when a UI layout is determined.

In another optional solution, a manner of obtaining the constraint relationship of the first type through grouping may be specifically as follows: a constraint relationship that is marked with neither the first keyword nor the second keyword is grouped as the first type.

It can be understood that because the constraint relationship that is marked with neither the first keyword nor the second keyword is usually applicable to various devices in various practical scenarios, the constraint relationship is grouped as the first type for unified processing, to reduce calculation overheads.

In another optional solution, the display scenario includes at least one of a special-shaped screen scenario, a foldable-screen scenario, a landscape-mode display scenario, and a portrait-mode display scenario.

In another optional solution, the data of the terminal includes an inherent device parameter of the terminal and data generated during running of the terminal.

In another optional solution, the calculation unit 702 is further configured to: calculate constraint solution information, where the constraint solution information is solution information calculated based on the first intermediate solution set and the constraint relationship of the second type.

It can be understood that solving may be further performed based on the first intermediate solution set and a constraint of the second type. In this way, a calculation amount of the terminal can be further reduced, to improve UI rendering efficiency of the terminal.

In another optional solution, the constraint relationship of the second type includes a constraint relationship of M display scenarios, a constraint relationship of N device parameters, and a constraint relationship of P pieces of data generated during running, where M, N, and P each are a positive integer; and in terms of calculating the constraint solution information, the calculation unit 702 is further configured to: calculate M second intermediate solution sets based on the first intermediate solution set, the constraint relationship of the P pieces of data generated during running, and the constraint relationship of the M display scenarios, where different second intermediate solution sets are calculated based on different constraint relationships of display scenarios, the constraint solution information includes the M second intermediate solution sets and the constraint relationship of the N device parameters, the constraint relationship of the device parameter is a constraint relationship of which the device parameter of the terminal needs to be used for solving, the constraint relationship of the display scenario is a constraint relationship of which the display scenario needs to be used for solving, and the constraint relationship of the data generated during running is a constraint relationship of which data generated during running of a device needs to be used for solving.

In this manner, the M second intermediate solution sets are separately calculated for the M display scenarios. In this way, the second intermediate solution sets may be subsequently provided for the terminal in different display scenarios in a targeted manner, to help various terminals determine the UI layout.

In another optional solution, the constraint relationship of the second type includes the constraint relationship of the M display scenarios, the constraint relationship of the N device parameters, and the constraint relationship of the P pieces of data generated during running, where M, N, and P each are a positive integer; and in terms of calculating the constraint solution information, the calculation unit 702 is further configured to: calculate one or more pieces of third information based on the first intermediate solution set, the constraint relationship of the P pieces of data generated during running, the constraint relationship of the N device parameters, and one or more groups of device parameters, where different third information is calculated based on different device parameters, and the constraint solution information includes the plurality of pieces of third information.

In this manner, a plurality of pieces of third information is separately calculated for a plurality of groups of device parameters. In this way, the third information can be subsequently provided for terminals with different device parameters in a targeted manner, to help various terminals determine the UI layout.

In another optional solution, the constraint relationship of the second type includes the constraint relationship of M display scenarios, the constraint relationship of the N device parameters, and the constraint relationship of the P pieces of data generated during running, where M, N, and P each are a positive integer; and in terms of calculating the constraint solution information, the calculation unit 702 is further configured to: calculate a plurality of pieces of fourth information based on the constraint relationship of the P pieces of data generated during running, the M second intermediate solution sets, the constraint relationship of the N device parameters, and the plurality of groups of device parameters, where different fourth information is calculated based on different second intermediate solution sets or different device parameters, the M second intermediate solution sets are calculated based on the first intermediate solution set, the constraint relationship of the P pieces of data generated during running, and the constraint relationship of the M display scenarios, different second intermediate solution sets are calculated based on different constraint relationship of display scenarios, and the constraint solution information includes the plurality of pieces of fourth information.

In this manner, a plurality of pieces of fourth information is separately calculated for the M display scenarios and a plurality of groups of device parameters. In this way, the fourth information may be subsequently provided for different device parameters and terminals in different display scenarios in a targeted manner, to help terminals with various device parameters in various display scenarios determine the UI layout.

In another optional solution, in terms of obtaining the plurality of constraint relationships in the UI, the first obtaining unit 701 is further configured to: respond to an input operation performed by a user, to obtain the plurality of constraint relationships, where the input operation includes at least one of a drag operation and a write operation, the drag operation is performed to drag the one or more components to a location on a screen, the plurality of constraint relationships are related to a location of the one or more components on the screen, and the write operation is performed to write one or more of the plurality of constraint relationships.

In another optional solution, the apparatus 70 further includes: a correction unit configured to: before the calculation unit calculates the first intermediate solution set based on the constraint relationship of the first type in the plurality of constraint relationships, correct a type of the plurality of constraint relationships based on a selection operation entered by the user, to determine the constraint relationship of the first type and the constraint relationship of the second type in the plurality of constraint relationships.

Herein, the IDE first automatically groups the constraint relationships into types, and then the types are further corrected manually, to not only improve grouping efficiency, but also ensure grouping accuracy.

It should be noted that for an implementation of the units, refer to the corresponding descriptions in the method embodiment shown in FIG. 3.

Figure 8:
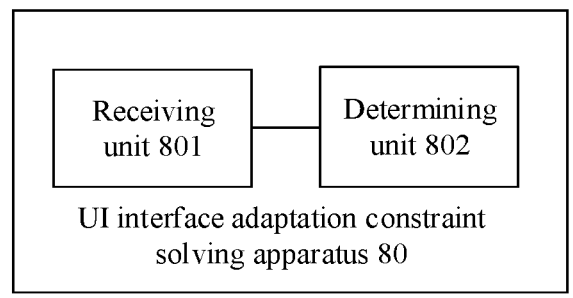
FIG. 8 is a schematic diagram of a structure of a UI adaptation solving apparatus according to an embodiment of the present disclosure.

FIG. 8 is a schematic diagram of a structure of a UI adaptation constraint solving apparatus 80 according to an embodiment of the present disclosure. The apparatus may be the foregoing terminal or a component in the terminal. The apparatus 80 may include a receiving unit 801 and a determining unit 802. The units are described in detail as follows.

The receiving unit 801 is configured to receive a resource file. The resource file includes at least one of a first intermediate solution set and constraint solution information, the constraint solution information is solution information calculated based on the first intermediate solution set and a constraint relationship of a second type, the first intermediate solution set is determined based on a constraint relationship of a first type, the constraint relationship of the first type is a constraint relationship solved in an IDE, the constraint relationship of the second type is a constraint relationship solved in a terminal or the IDE, and the constraint relationship is used to describe a layout of one or more components in a UI of the terminal.

The determining unit 802 is configured to determine the layout of the components in the UI of the terminal based on the resource file.

In the method, a plurality of constraint relationships in the UI are grouped into the first type and the second type, the constraint relationship of the first type is set to be solved in the IDE, and the constraint relationship of the second type is allowed to be solved in the terminal. Based on this mechanism, most solving operations can be basically completed in the IDE, to significantly reduce calculation pressure existing when the terminal renders the UI, and improve UI rendering efficiency.

In an optional solution: a constraint relationship marked with a first keyword (for example, words such as Vstack and Hstack in an annotation) is grouped as the second type, and the constraint relationship marked with the first keyword is a constraint relationship of a display scenario; and a constraint relationship marked with a second keyword (for example, a Bindo function) is grouped as the second type, and the constraint relationship marked with the second keyword is constraint relationship of which data of the terminal needs to be used for a solving process.

It can be understood that, because different terminals usually have different display scenarios and different device parameters, a constraint relationship of a specific display scenario or a specific group of device parameters are not applicable to all terminals. Therefore, a constraint relationship of a display scenario and a constraint relationship of which the data of the terminal needs to be used for a solving process are grouped as the second type, to conveniently perform a differentiated operation, so that layout information required by different terminals can be determined in a targeted manner when the UI layout is determined.

In another optional solution: a constraint relationship that is marked with neither the first keyword nor the second keyword is grouped as the first type.

It can be understood that because the constraint relationship that is marked with neither the first keyword nor the second keyword is usually applicable to various devices in various practical scenarios, the constraint relationship is grouped as the first type for unified processing, to reduce calculation overheads.

With reference to any one of the fourth aspect and the possible implementations of the fourth aspect, in a third possible implementation of the fourth aspect, the display scenario includes at least one of a special-shaped screen scenario, a foldable-screen scenario, a landscape-mode display scenario, and a portrait-mode display scenario.

In another optional solution, the data of the terminal includes an inherent device parameter of the terminal and data generated during running of the terminal.

In another optional solution, a constraint relationship grouped as the second type includes a constraint relationship of M display scenarios, a constraint relationship of N device parameters, and a constraint relationship of P pieces of data generated during running, where M, N, and P each are a positive integer; the constraint solution information includes at least two of second information, a plurality of pieces of third information, and a plurality of pieces of fourth information; the second information includes M second intermediate solution sets and the constraint relationship of the N device parameters, each second intermediate solution set is a solution set calculated based on the first intermediate solution set, the constraint relationship of the P pieces of data generated during running, and the constraint relationship of one of the M display scenarios, and different second intermediate solution sets are calculated based on different constraint relationships of display scenarios; the plurality of pieces of third information include solution information calculated based on the first intermediate solution set, the constraint relationship of the P pieces of data generated during running, the constraint relationship of the N device parameters, and a plurality of groups of device parameters, and different third information is calculated based on different device parameters; and the plurality of pieces of fourth information include solution information calculated based on the M second intermediate solution sets, the constraint relationship of the N device parameters, and the plurality of groups of device parameters, and different fourth information is calculated based on different second intermediate solution sets or device parameters.

In another optional solution, when determining the layout of the components in the UI of the terminal based on the resource file, the determining unit is further configured to: if a display scenario of the terminal is not one of the M display scenarios and the device parameter of the terminal does not belong to one group of device parameters in the plurality of groups of device parameters, determine a UI layout of the terminal based on the first intermediate solution set, the constraint relationship of the N device parameters, and the constraint relationship of the P pieces of data generated during running; or if a display scenario of the terminal is not one of the M display scenarios and the device parameter of the terminal belongs to one group of device parameters in the plurality of groups of device parameters, determine a UI layout of the terminal based on one piece of third information, where a device parameter used to calculate the one piece of third information is the same as the device parameter of the terminal; or if a display scenario of the terminal is one of the M display scenarios but the device parameter of the terminal does not belong to any one of the plurality of groups of device parameters, determine a UI layout of the terminal based on one second intermediate solution set in the second information, the constraint relationship of the N device parameters, and the device parameter of the terminal, where the one second intermediate solution set is calculated based on a constraint relationship of the display scenario of the terminal; or if a display scenario of the terminal is one of the M display scenarios and the device parameter of the terminal belongs to one of the plurality of groups of device parameters, determine a UI layout of the terminal based on one piece of fourth information, where a second intermediate solution set used to calculate the one piece of fourth information is calculated based on a constraint relationship of the display scenario of the terminal, a device parameter used to calculate the one piece of fourth information is the same as the device parameter of the terminal, and the constraint relationship of the device parameter is a constraint relationship of which the device parameter of the terminal needs to be used for solving.

In this manner, the terminal obtains the first information, the second information, the third information, and the fourth information that are solution information obtained in different calculation phases, and then selects, in a targeted manner based on the display scenario and the device parameter of the terminal, information that is closest to a final solution. Therefore, a calculation amount existing when the terminal calculates the final solution can be reduced as much as possible, and UI rendering efficiency can be improved.

In another optional solution, a constraint relationship grouped as the second type includes a constraint relationship of M display scenarios, a constraint relationship of N device parameters, and a constraint relationship of P pieces of data generated during running; and the apparatus further includes: a sending unit configured to send description information to a server before the receiving unit receives a resource file, where the description information is used to describe a display scenario and the device parameter of the terminal, where if the terminal is not one of the M display scenarios and the device parameter of the terminal does not belong to one group of device parameters in the plurality of groups of device parameters, the resource file includes the first intermediate solution set, the constraint relationship of the N device parameters, and the constraint relationship of the P pieces of data generated during running; or if the server determines that the display scenario of the terminal is not one of the M display scenarios and the device parameter of the terminal belongs to one group of device parameters in the plurality of groups of device parameters, the resource file includes one piece of third information, the piece of third information includes solution information calculated based on the first intermediate solution set, the constraint relationship of the P pieces of data generated during running, the constraint relationship of the N device parameters, and the one group of device parameters, and the group of device parameters are the same as the device parameter of the terminal; or if the server determines that the display scenario of the terminal is one of the M display scenarios but the device parameter of the terminal does not belong to any one of the plurality of groups of device parameters, the resource file includes one second intermediate solution set and the constraint relationship of the N device parameters, and the one second intermediate solution set is a solution set calculated based on the first intermediate solution set, the constraint relationship of the P pieces of data generated during running, and the constraint relationship of the display scenario of the terminal; or if the server determines that the display scenario of the terminal is one of the M display scenarios and the device parameter of the terminal belongs to one group of device parameters in a plurality of groups of device parameters, the resource file includes one piece of fourth information, the one piece of fourth information includes solution information calculated based on the one second intermediate solution set, the constraint relationship of the N device parameters, and the one group of device parameters, and the constraint relationship of the device parameter is a constraint relationship of which the device parameter of the terminal needs to be used for solving.

In this manner, the terminal obtains the first information, the second information, the third information, and the fourth information that are solution information obtained in different calculation phases, and then selects, in a targeted manner based on the display scenario and the device parameter of the terminal, information that is closest to a final solution. Therefore, a calculation amount existing when the terminal calculates the final solution can be reduced as much as possible. In addition, the information that is closest to the final solution is selected by a device (for example, the IDE) other than the terminal. Therefore, the calculation amount of the terminal is further reduced, and UI rendering efficiency of the terminal can be improved.

It should be noted that for an implementation of the units, refer to the corresponding descriptions in the method embodiment shown in FIG. 3.

Figure 9:
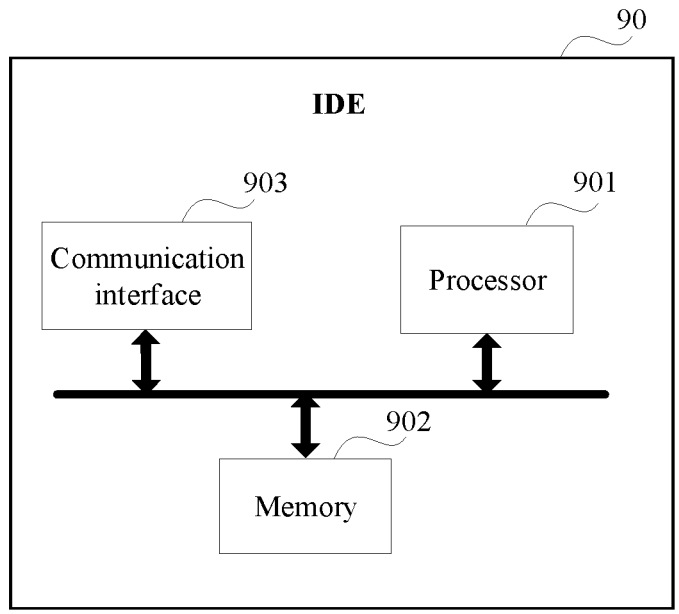
FIG. 9 is a schematic diagram of a structure of an IDE according to an embodiment of the present disclosure.

FIG. 9 shows a compiler IDE 90 according to an embodiment of the present disclosure. The IDE 90 includes a processor 901, a memory 902, and a communication interface 903. The processor 901, the memory 902, and the communication interface 903 are connected to each other by using a bus.

The memory 902 includes but is not limited to a random-access memory (RAM), a read-only memory (ROM), an erasable programmable read-only memory (EPROM), or a compact disc read-only memory (CD-ROM). The memory 902 is configured to store related computer programs and data. The communication interface 903 is configured to receive and send data.

The processor 901 may be one or more central processing units (CPUs). When the processor 901 is one CPU, the CPU may be a single-core CPU, or may be a multi-core CPU.

The processor 901 in the IDE 90 is configured to read computer program code stored in the memory 902, to perform the following operation: obtaining a plurality of constraint relationships in a user interface UI, where the plurality of constraint relationships are used to determine a layout of one or more components in the UI. Optionally, each constraint relationship represents a location of a component in the UI, and the location may be a location relative to another component or an invisible guideline. The invisible guideline is a reference line for reference and comparison in the UI, is an invisible line, and is used to measure a location of a component in the UI. A component may have one or at least two constraint relationships. When at least two constraint relationships exist, each of the at least two constraint relationships can only constrain a location of the component to some extent. The at least two constraint relationships can be combined to more accurately constrain a location of the component in the UI.

A first intermediate solution set is calculated based on a constraint relationship of a first type in the plurality of constraint relationships. The constraint relationship of the first type is a constraint relationship solved in an IDE, the first intermediate solution set is used to determine the layout of the one or more components in the UI together with a constraint relationship of a second type in the plurality of constraint relationships, and the constraint relationship of the second type is a constraint relationship solved in a terminal or the IDE.

In the method, a plurality of constraint relationships in the UI are grouped into the first type and the second type, the constraint relationship of the first type is set to be solved in the IDE, and the constraint relationship of the second type is allowed to be solved in the terminal. Based on this mechanism, most solving operations can be basically completed in the IDE, to significantly reduce calculation pressure existing when the terminal renders the UI, and improve UI rendering efficiency.

With reference to the first aspect, in a possible implementation of the first aspect, the constraint relationship of the second type includes a constraint relationship related to a display scenario, or the constraint relationship of the second type includes a constraint relationship of which data of the terminal needs to be used for a solving process. Optionally, the constraint relationship of the second type is identified based on a keyword in each constraint relationship. The keyword indicates that the constraint relationship is a constraint relationship related to the display scenario or a constraint relationship of which the data of the terminal needs to be used for a solving process. In addition, a constraint relationship including no keyword is a constraint relationship of the first type.

In another optional solution, a manner of obtaining the constraint relationship of the second type through grouping may be as follows: a constraint relationship marked with a first keyword (for example, words such as Vstack and Hstack in an annotation) is grouped as the second type, and the constraint relationship marked with the first keyword is a constraint relationship of a display scenario; and a constraint relationship marked with a second keyword (for example, a Bindo function) is grouped as the second type, and the constraint relationship marked with the second keyword is constraint relationship of which data of the terminal needs to be used for a solving process.

It can be understood that, because different terminals usually have different display scenarios and different device parameters, a constraint relationship of a specific display scenario or a specific group of device parameters are not applicable to all terminals. Therefore, a constraint relationship of a display scenario and a constraint relationship of which the data of the terminal needs to be used for a solving process are grouped as the second type, to conveniently perform a differentiated operation, so that layout information required by different terminals can be determined in a targeted manner when the UI layout is determined.

In another optional solution, a manner of obtaining the constraint relationship of the first type through grouping may be as follows: a constraint relationship that is marked with neither the first keyword nor the second keyword is grouped as the first type.

It can be understood that because the constraint relationship that is marked with neither the first keyword nor the second keyword is usually applicable to various devices in various practical scenarios, the constraint relationship is grouped as the first type for unified processing, to reduce calculation overheads.

In another optional solution, the display scenario includes at least one of a special-shaped screen scenario, a foldable-screen scenario, a landscape-mode display scenario, and a portrait-mode display scenario.

In another optional solution, the data of the terminal includes an inherent device parameter of the terminal and data generated during running of the terminal.

In another optional solution, the processor is further configured to: output constraint solution information through the communication interface, where the constraint solution information is solution information calculated based on the first intermediate solution set and the constraint relationship of the second type.

It can be understood that solving may be further performed based on the first intermediate solution set and a constraint of the second type. In this way, a calculation amount of the terminal can be further reduced, to improve UI rendering efficiency of the terminal.

In another optional solution, a constraint relationship grouped as the second type includes a constraint relationship of M display scenarios, a constraint relationship of N device parameters, and a constraint relationship of P pieces of data generated during running, where M, N, and P each are a positive integer; and in terms of calculating the constraint solution information, the processor is further configured to: calculate M second intermediate solution sets based on the first intermediate solution set, the constraint relationship of the P pieces of data generated during running, and the constraint relationship of the M display scenarios, where different second intermediate solution sets are calculated based on different constraint relationships of display scenarios, the constraint solution information includes the M second intermediate solution sets and the constraint relationship of the N device parameters, the constraint relationship of the device parameter is a constraint relationship of which the device parameter of the terminal needs to be used for solving, the constraint relationship of the display scenario is a constraint relationship of which the display scenario needs to be used for solving, and the constraint relationship of the data generated during running is a constraint relationship of which data generated during running of a device needs to be used for solving.

In this manner, the M second intermediate solution sets are separately calculated for the M display scenarios. In this way, the second intermediate solution sets may be subsequently provided for the terminal in different display scenarios in a targeted manner, to help various terminals determine a UI layout in various display scenarios.

In another optional solution, the constraint relationship of the second type includes the constraint relationship of M display scenarios, the constraint relationship of the N device parameters, and the constraint relationship of the P pieces of data generated during running, where M, N, and P each are a positive integer; and in terms of calculating the constraint solution information, the processor is further configured to: calculate one or more pieces of third information based on the first intermediate solution set, the constraint relationship of the P pieces of data generated during running, the constraint relationship of the N device parameters, and one or more groups of device parameters, where different third information is calculated based on different device parameters, and the constraint solution information includes the plurality of pieces of third information.

In this manner, a plurality of pieces of third information is separately calculated for a plurality of groups of device parameters. In this way, the third information can be subsequently provided for terminals with different device parameters in a targeted manner, to help various terminals determine the UI layout.

In another optional solution, the constraint relationship of the second type includes the constraint relationship of M display scenarios, the constraint relationship of the N device parameters, and the constraint relationship of the P pieces of data generated during running, where M, N, and P each are a positive integer; and in terms of calculating the constraint solution information, the processor is further configured to: calculate one or more pieces of fourth information based on the constraint relationship of the P pieces of data generated during running, the M second intermediate solution sets, the constraint relationship of the N device parameters, and the one or more groups of device parameters, where different fourth information is calculated based on different second intermediate solution sets or different device parameters, the M second intermediate solution sets are calculated based on the first intermediate solution set, the constraint relationship of the P pieces of data generated during running, and the constraint relationship of the M display scenarios, different second intermediate solution sets are calculated based on different constraint relationship of display scenarios, the constraint relationship of the device parameter is a constraint relationship of which the device parameter of the terminal needs to be used for solving, and the constraint solution information includes the plurality of pieces of fourth information.

In this manner, a plurality of pieces of fourth information is separately calculated for the M display scenarios and a plurality of groups of device parameters. In this way, the fourth information may be subsequently provided for different device parameters and terminals in different display scenarios in a targeted manner, to help terminals with various device parameters in various display scenarios determine the UI layout.

In another optional solution, in terms of obtaining the plurality of constraint relationships in the UI, the processor is further configured to: respond to an input operation performed by a user, to obtain the plurality of constraint relationships, where the input operation includes at least one of a drag operation and a write operation, the drag operation is performed to drag the one or more components to a location on a screen, the plurality of constraint relationships are related to a location of the one or more components on the screen, and the write operation is performed to write one or more of the plurality of constraint relationships.

In another optional solution, before the calculating a first intermediate solution set based on a constraint relationship of a first type in the plurality of constraint relationships, the processor is further configured to: correct a type of the plurality of constraint relationships based on a selection operation entered by the user, to determine the constraint relationship of the first type and the constraint relationship of the second type in the plurality of constraint relationships.

Herein, the IDE first automatically groups the constraint relationships into types, and then the types are further corrected manually, to not only improve grouping efficiency, but also ensure grouping accuracy.

It should be noted that for an implementation of various operations, refer to the corresponding descriptions in the method embodiment shown in FIG. 3.

Figure 10:
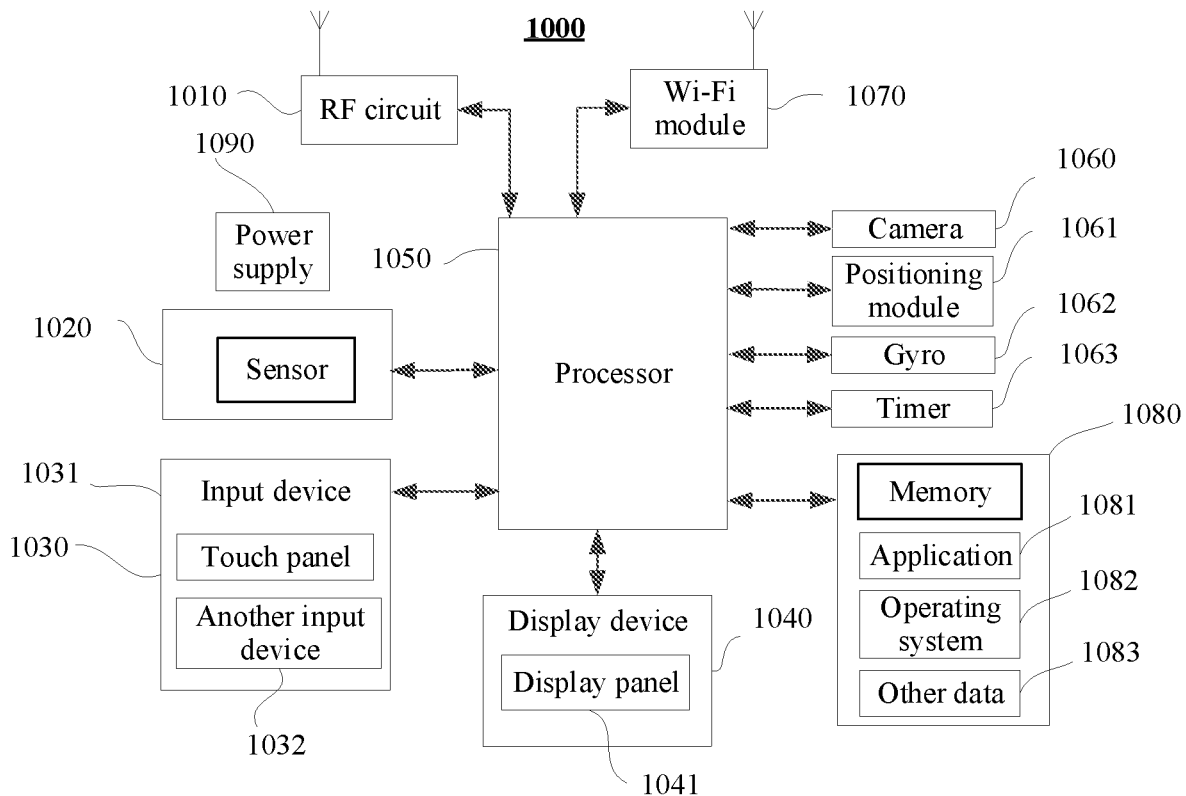
FIG. 10 is a schematic diagram of a structure of a terminal according to an embodiment of the present disclosure.

FIG. 10 is a schematic diagram of a structure of a terminal 1000 to which an embodiment of the present disclosure is applied. The terminal 1000 includes a memory 1080, a processor 1050, and a display device 1040. The memory 1080 stores a computer program. The computer program includes an operating system program 1082, an application 1081, and the like. The application 1081 includes a browser program. The processor 1050 is configured to: read the computer program in the memory 1080, and then perform a method defined by the computer program. For example, the processor 1050 reads the operating system program 1082, to run an operating system and implement various functions of the operating system on the terminal 1000, or reads one or more applications 1081, to run an application on the terminal, for example, reads the browser program to run a browser. A UI of the browser needs to be presented to a user. Therefore, the terminal performs the UI adaptation constraint solving method.

The processor 1050 may include one or more processors. For example, the processor 1050 may include one or more central processing units. When the processor 1050 includes a plurality of processors, the plurality of processors may be integrated into a same chip, or may be independent chips. One processor may include one or more processing cores. All the following embodiments are described by using a plurality of cores as an example, but the UI adaptation constraint solving method provided in embodiments of the present disclosure may also be applied to a single-core processor.

In addition, the memory 1080 further stores other data 1083 different from the computer program. The other data 1083 may include data generated after the operating system 1082 or the application 1081 is run. The data includes system data (for example, a configuration parameter of the operating system) and user data. For example, first information, second information, third information, and fourth information that are obtained by the terminal may be considered as user data, and a final solution to a constraint relationship solved based on the information may also be considered as user data.

The memory 1080 usually includes an internal memory and an external memory. The internal memory may be a RAM, a ROM, a cache, or the like. The external memory may be a hard disk, an optical disk, a Universal Serial Bus (USB) drive, a floppy disk, a tape drive, or the like. A computer program is usually stored in the external memory. Before performing processing, the processor loads the computer program from the external memory to the internal memory. In this embodiment of the present disclosure, the first information, the second information, the third information, the fourth information, and the like may be stored in the external memory. When solving needs to be performed based on the information and the UI is rendered after the final solution is obtained, the information or the final solution may be first loaded to the internal memory.

The operating system program 1082 includes a computer program that can implement the UI adaptation constraint solving method provided in embodiments of the present disclosure, so that after reading the operating system program 1082, the processor 1050 performs the following operations: receiving a resource file, where the resource file includes at least one of a first intermediate solution set and constraint solution information, the constraint solution information is solution information calculated based on the first intermediate solution set and a constraint relationship of a second type, the first intermediate solution set is determined based on a constraint relationship of a first type, the constraint relationship of the first type is a constraint relationship solved in an IDE, the constraint relationship of the second type is a constraint relationship solved in a terminal or the IDE, and the constraint relationship is used to describe a layout of one or more components in a UI of the terminal; and determining the layout of the components in the UI of the terminal based on the resource file.

In the method, a plurality of constraint relationships in the UI are grouped into the first type and the second type, the constraint relationship of the first type is set to be solved in the IDE, and the constraint relationship of the second type is allowed to be solved in the terminal. Based on this mechanism, most solving operations can be basically completed in the IDE, to significantly reduce calculation pressure existing when the terminal renders the UI, and improve UI rendering efficiency.

In an optional solution: a constraint relationship marked with a first keyword (for example, words such as Vstack and Hstack in an annotation) is grouped as the second type, and the constraint relationship marked with the first keyword is a constraint relationship of a display scenario; and a constraint relationship marked with a second keyword (for example, a Bind() function) is grouped as the second type, and the constraint relationship marked with the second keyword is constraint relationship of which data of the terminal needs to be used for a solving process.

It can be understood that, because different terminals usually have different display scenarios and different device parameters, a constraint relationship of a specific display scenario or a specific group of device parameters are not applicable to all terminals. Therefore, a constraint relationship of a display scenario and a constraint relationship of which the data of the terminal needs to be used for a solving process are grouped as the second type, to conveniently perform a differentiated operation, so that layout information required by different terminals can be determined in a targeted manner when the UI layout is determined.

In another optional solution: a constraint relationship that is marked with neither the first keyword nor the second keyword is grouped as the first type.

It can be understood that because the constraint relationship that is marked with neither the first keyword nor the second keyword is usually applicable to various devices in various practical scenarios, the constraint relationship is grouped as the first type for unified processing, to reduce calculation overheads.

In another optional solution, the display scenario includes at least one of a special-shaped screen scenario, a foldable-screen scenario, a landscape-mode display scenario, and a portrait-mode display scenario.

In another optional solution, the data of the terminal includes a device parameter of the terminal and data generated during running of the terminal.

In another optional solution, a constraint relationship grouped as the second type includes a constraint relationship of M display scenarios, a constraint relationship of N device parameters, and a constraint relationship of P pieces of data generated during running, where M, N, and P each are a positive integer; the constraint solution information includes at least two of second information, a plurality of pieces of third information, and a plurality of pieces of fourth information; the second information includes M second intermediate solution sets and the constraint relationship of the N device parameters, each second intermediate solution set is a solution set calculated based on the first intermediate solution set, the constraint relationship of the P pieces of data generated during running, and the constraint relationship of one of the M display scenarios, and different second intermediate solution sets are calculated based on different constraint relationships of display scenarios; the plurality of pieces of third information include solution information calculated based on the first intermediate solution set, the constraint relationship of the P pieces of data generated during running, the constraint relationship of the N device parameters, and a plurality of groups of device parameters, and different third information is calculated based on different device parameters; and the plurality of pieces of fourth information include solution information calculated based on the M second intermediate solution sets, the constraint relationship of the N device parameters, and the plurality of groups of device parameters, and different fourth information is calculated based on different second intermediate solution sets or device parameters, where the constraint relationship of the device parameter is a constraint relationship for solving a device parameter of a terminal that needs to be used.

In another optional solution, in terms of determining the layout of the components in the UI of the terminal based on the resource file, the processor is further configured to: if a display scenario of the terminal is not one of the M display scenarios and the device parameter of the terminal does not belong to one group of device parameters in the plurality of groups of device parameters, determine a UI layout of the terminal based on the first intermediate solution set, the constraint relationship of the N device parameters, and the constraint relationship of the P pieces of data generated during running; or if a display scenario of the terminal is not one of the M display scenarios and the device parameter of the terminal belongs to one group of device parameters in the plurality of groups of device parameters, determine a UI layout of the terminal based on one piece of third information, where a device parameter used to calculate the one piece of third information is the same as the device parameter of the terminal; or if a display scenario of the terminal is one of the M display scenarios but the device parameter of the terminal does not belong to any one of the plurality of groups of device parameters, determine a UI layout of the terminal based on one second intermediate solution set in the second information, the constraint relationship of the N device parameters, and the device parameter of the terminal, where the one second intermediate solution set is calculated based on a constraint relationship of the display scenario of the terminal; or if a display scenario of the terminal is one of the M display scenarios and the device parameter of the terminal belongs to one group of device parameters in the plurality of groups of device parameters, determine a UI layout of the terminal based on one piece of fourth information, where a second intermediate solution set used to calculate the one piece of fourth information is calculated based on a constraint relationship of the display scenario of the terminal, and a device parameter used to calculate the one piece of fourth information is the same as the device parameter of the terminal.

In this manner, the terminal obtains the first information, the second information, the third information, and the fourth information that are solution information obtained in different calculation phases, and then selects, in a targeted manner based on the display scenario and the device parameter of the terminal, information that is closest to a final solution. Therefore, a calculation amount existing when the terminal calculates the final solution can be reduced as much as possible, and UI rendering efficiency can be improved.

In another optional solution, a constraint relationship grouped as the second type includes a constraint relationship of M display scenarios, a constraint relationship of N device parameters, and a constraint relationship of P pieces of data generated during running; and before receiving the resource file through a communication interface, the processor is further configured to: send description information to a server through the communication interface, where the description information is used to describe a display scenario and the device parameter of the terminal, where if the server determines that the display scenario of the terminal is not one of the M display scenarios and the device parameter of the terminal does not belong to one group of device parameters in the plurality of groups of device parameters, the resource file includes the first intermediate solution set, the constraint relationship of the N device parameters, and the constraint relationship of the P pieces of data generated during running; or if the server determines that the display scenario of the terminal is not one of the M display scenarios and the device parameter of the terminal belongs to one group of device parameters in the plurality of groups of device parameters, the resource file includes one piece of third information, the piece of third information includes solution information calculated based on the first intermediate solution set, the constraint relationship of the P pieces of data generated during running, the constraint relationship of the N device parameters, and the one group of device parameters, and the group of device parameters are the same as the device parameter of the terminal; or if the server determines that the display scenario of the terminal is one of the M display scenarios but the device parameter of the terminal does not belong to any one of the plurality of groups of device parameters, the resource file includes one second intermediate solution set and the constraint relationship of the N device parameters, and the one second intermediate solution set is a solution set calculated based on the first intermediate solution set, the constraint relationship of the P pieces of data generated during running, and the constraint relationship of the display scenario of the terminal; or if the server determines that the display scenario of the terminal is one of the M display scenarios and the device parameter of the terminal belongs to one group of device parameters in a plurality of groups of device parameters, the resource file includes one piece of fourth information, the one piece of fourth information includes solution information calculated based on the one second intermediate solution set, the constraint relationship of the N device parameters, and the one group of device parameters, and the constraint relationship of the device parameter is a constraint relationship of which the device parameter of the terminal needs to be used for solving.

In this manner, the terminal obtains the first information, the second information, the third information, and the fourth information that are solution information obtained in different calculation phases, and then selects, in a targeted manner based on the display scenario and the device parameter of the terminal, information required by the terminal, to calculate a final solution to the constraint relationship, so that a calculation amount of the terminal can be reduced as much as possible, and UI rendering efficiency can be improved.

In this manner, the terminal obtains the first information, the second information, the third information, and the fourth information that are solution information obtained in different calculation phases, and then selects, in a targeted manner based on the display scenario and the device parameter of the terminal, information that is closest to a final solution. Therefore, a calculation amount existing when the terminal calculates the final solution can be reduced as much as possible. In addition, the information that is closest to the final solution is selected by a device (for example, the IDE) other than the terminal. Therefore, the calculation amount of the terminal is further reduced, and UI rendering efficiency of the terminal can be improved.

It should be noted that for an implementation of various operations, refer to the corresponding descriptions in the method embodiment shown in FIG. 3.

Further, the operating system may open an invoking interface of a UI adaptation constraint solving function to an upper-layer application. After the processor 1050 reads the application 1081 from the memory 1080 and runs the application, the application may invoke, through the call interface, the UI adaptation constraint solving function provided in the operating system, to obtain the final solution to the constraint relationship, and then render the UI.

The terminal 1000 may further include an input device 1030 configured to: receive entered digital information, character information, or a contact touch operation/non-contact gesture, and generate signal input related to a user setting and function control of the terminal 1000, and the like. Specifically, in this embodiment of the present disclosure, the input device 1030 may include a touch panel 1031. The touch panel 1031 is also referred to as a touchscreen, and may collect a touch operation performed by a user on or near the touch panel 1031 (for example, an operation performed by the user on or near the touch panel 1031 by using any appropriate object or accessory, for example, a finger or a stylus), and drive a corresponding connection apparatus based on a preset program. Optionally, the touch panel 1031 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch point coordinates, and sends the touch point coordinates to the processor 1050. The touch controller can receive and execute a command sent by the processor 1050. For example, the user taps a virtual button on the touch panel 1031 by using a finger; the touch detection apparatus detects a signal brought by the tap, and transfers the signal to the touch controller; the touch controller converts the signal into coordinates, and sends the coordinates to the processor 1050; and the processor 1050 performs a corresponding operation based on the coordinates and a type (tap or double-tap) of the signal, and displays an operation result on a display panel 1041.

The touch panel 1031 may be implemented by using a plurality of types such as a resistive type, a capacitive type, an infrared ray, and a surface acoustic wave. In addition to the touch panel 1031, the input device 1030 may further include another input device 1032. The another input device 1032 may include but is not limited to one or more of a physical keyboard, a function key (for example, a volume control key or an on/off key), a trackball, a mouse, or an operating rod.

The terminal 1000 may further include the display device 1040, and the display device 1040 includes the display panel 1041 configured to display information entered by the user or information provided for the user, various menu interfaces of the terminal 1000, and the like. It can be understood that for any content displayed on the display device 1040, the UI needs to be rendered. The UI adaptation constraint solving method needs to be performed before rendering. For a specific process, refer to corresponding descriptions in the method embodiment shown in FIG. 3. The display device 1040 may include a display panel 1041. Optionally, the display panel 1041 may be configured in a form of a liquid-crystal display (LCD), an organic light-emitting diode (OLED), or the like. In some other embodiments, the touch panel 1031 may cover the display panel 1041, to form a touchscreen.

In addition, the terminal 1000 may further include a power supply 1090 configured to supply power to another module, a camera 1060 configured to capture a photograph or a video, a positioning module (for example, a Global Positioning System (GPS)) 1061 for obtaining a geographical location of the terminal, a gyro 1062 for obtaining a placement posture (for example, an angle or an orientation) of the terminal, and a timer 1063 for recording time. The terminal 1000 may further include one or more sensors 1020 such as an acceleration sensor and an optical sensor. The terminal 1000 may further include a radio frequency (RF) circuit 1010 configured to perform network communication with a wireless network device, and may further include a Wi-Fi module 1070 configured to perform Wi-Fi communication with another device.

The foregoing mainly describes a specific procedure of the method provided in embodiments of the present disclosure. The following describes, with reference to FIG. 11 by using an Android operating system as an example, an implementation location and a running status of the method provided in embodiments of the present disclosure. For a more specific procedure of the method, refer to the foregoing embodiments.

Figure 11:
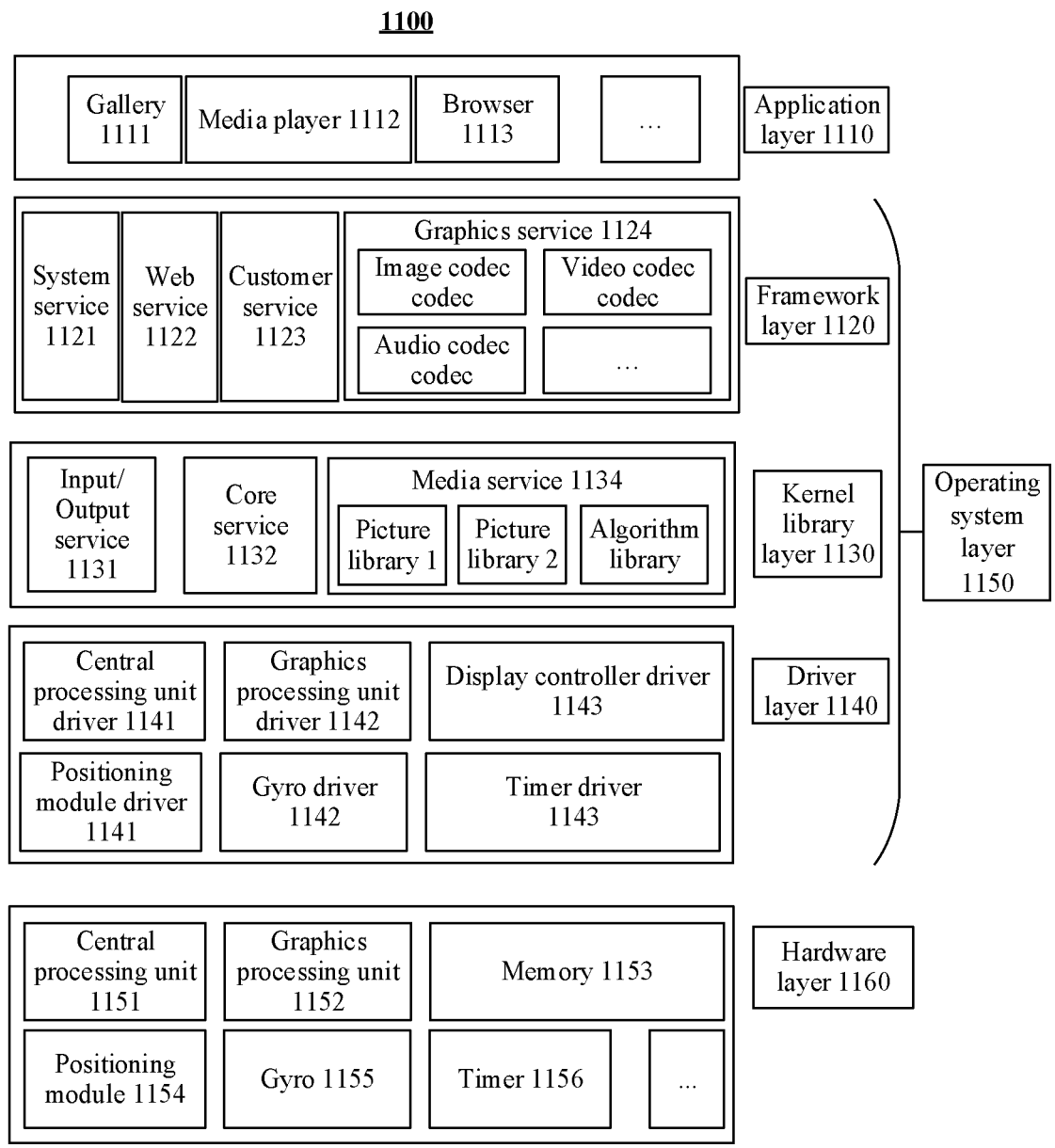
FIG. 11 is a schematic diagram of a structure of another terminal according to an embodiment of the present disclosure.

FIG. 11 is a schematic diagram of a structure of a terminal 1100 according to an embodiment of the present disclosure. The terminal 1100 may be a device in embodiments of the present disclosure. The terminal 1100 includes an application layer 1110 and an operating system layer 1150, and an operating system may be an Android operating system. The operating system layer 1150 is further divided into a framework layer 1120, a kernel library layer 1130, and a driver layer 1140. The operating system layer 1150 in FIG. 11 may be considered as a specific implementation of the operating system 1082 in FIG. 10, and the application layer 1110 in FIG. 11 may be considered as a specific implementation of the application 1081 in FIG. 10. The driver layer 1140 includes a CPU driver 1141, a GPU driver 1142, a display controller driver 1143, a positioning module driver 1144, a gyro driver 1145, a timer driver 1146, and the like. The kernel library layer 1130 is a core part of the operating system, and includes an input/output service 1131, a core service 1132, a media service 1134, and the like. The media service 1134 includes a picture library 1 of a JPEG format, a picture library 2 of a PNG format, and a picture library of another format. The media service 1134 further includes an algorithm library, and the algorithm library is used to store a picture processing related algorithm in the present disclosure, for example, an algorithm for selecting a first picture and an algorithm for selecting a reference picture. The framework layer 1120 may include a graphics service 1124, a system service 1121, a web service 1122, a customer service 1123, and the like. The graphics service 1124 may include an image codec, a video codec, an audio codec, and the like. The solution in the present disclosure is applied to the image codec. The application layer 1110 may include a gallery 1111, a media player 1112, a browser 1113, and the like.

In addition, under the driver layer 1140, the computer system 1100 further includes a hardware layer 1160. The hardware layer 1160 of the computer system 1100 may include a CPU 1151 and a graphics processing unit (GPU) 1152 (equivalent to a specific implementation of the processor 1050 in FIG. 10), may further include a memory 1153 (equivalent to the memory 1080 in FIG. 10), including an internal memory and an external memory, may further include a positioning module 1154 (equivalent to the positioning module 1061 in FIG. 10) and a gyro 1155 (equivalent to the display device 1602 in FIG. 10), may further include a timer 1156 (equivalent to the timer 1063 in FIG. 10), and may further include one or more sensors (equivalent to the sensor 1020 in FIG. 10). Certainly, in addition, the hardware layer 1160 may further include the power supply, the camera, the RF circuit, and the Wi-Fi module that are shown in FIG. 10, and may further include another hardware module not shown in FIG. 10, for example, a memory controller and a display controller.

An embodiment of the present disclosure further provides a chip system. The chip system includes at least one processor, memory, and interface circuit. The memory, the transceiver, and the at least one processor are interconnected through a line, and the at least one memory stores a computer program. When the computer program is executed by the processor, the method procedure shown in FIG. 3 is implemented.

An embodiment of the present disclosure further provides a computer-readable storage medium. The computer-readable storage medium stores a computer program, and when the computer program is run on a processor, the method procedure shown in FIG. 3 is implemented.

An embodiment of the present disclosure further provides a computer program product. When the computer program product is run on a processor, the method procedure shown in FIG. 3 is implemented.

In conclusion, by implementing embodiments of the present disclosure, a plurality of constraint relationships in a UI are grouped into a first type and a second type, a constraint relationship of the first type is set to be solved in an IDE, and a constraint relationship of the second type is allowed to be solved in a terminal. Based on this mechanism, most solving operations can be basically completed in the IDE, to significantly reduce calculation pressure existing when the terminal renders the UI, and improve UI rendering efficiency. A person of ordinary skill in the art may understand that all or a part of the procedure of the method in the foregoing embodiments may be implemented by a computer program instructing related hardware. The computer program may be stored in a computer-readable storage medium. When the computer program is run, the procedure in the foregoing method embodiment is performed. The foregoing storage medium includes: any medium that can store computer program code such as a ROM, a RAM, a magnetic disk, or an optical disc.

What is claimed is:

1. A method implemented by an integrated development environment (IDE), the method comprising:
    obtaining a plurality of constraint relationships of a user interface (UI);
    solving a first constraint relationship of a first type in the plurality of constraint relationships in the IDE;
    calculating a first intermediate solution set based on a-the first constraint relationship; and
    outputting the first intermediate solution set,
    wherein a layout of one or more components in the UI is based on the first intermediate solution set and a second constraint relationship of a second type in the plurality of constraint relationships, and
    wherein the second constraint relationship for solving in a terminal or the IDE.

2. The method of claim 1, wherein the second constraint relationship is related to a display scenario, or requires first data of the terminal for solving.

3. The method of claim 2, further comprising identifying the second constraint relationship based on a keyword, wherein the keyword indicates that the second constraint relationship is related to the display scenario or that the second constraint relationship requires the first data of the terminal for solving, and wherein the first constraint relationship comprises no keyword.

4. The method of claim 2, wherein the display scenario comprises at least one of a special-shaped screen scenario, a foldable-screen scenario, a landscape-mode display scenario, or a portrait-mode display scenario.

5. The method of claim 2, wherein the first data of the terminal comprises a device parameter of the terminal and second data based on running of the terminal.

6. The method of claim 5, further comprising=calculating constraint solution information based on the first intermediate solution set and the second constraint relationship.

7. The method of claim 1, wherein obtaining the plurality of constraint relationships in the UI comprises responding to a user-input operation to obtain the plurality of constraint relationships, wherein the user-input operation comprises at least one of a drag operation or a write operation, wherein the drag operation drags the one or more components to a location on a screen, wherein the plurality of constraint relationships is related to a location of the one or more components on the screen, and wherein the write operation writes one or more of the plurality of constraint relationships.

8. The method of claim 1, wherein prior to calculating the first intermediate solution set, the method further comprises=correcting a type of the plurality of constraint relationships based on a user-selection operation to determine the first constraint relationship and the second constraint relationship in the plurality of constraint relationships.

9. A method implemented by a terminal, the method comprising:
    receiving a resource file comprising at least one of a first intermediate solution set or constraint solution information, wherein the first intermediate solution set is based on a first constraint relationship of a first type, wherein the constraint solution information is based on the first intermediate solution set and a second constraint relationship of a second type, wherein the first constraint relationship is for solving in an integrated development environment (IDE), wherein the second constraint relationship is for solving in the terminal or the IDE, and wherein constraint relationships describe a layout of one or more components in a user interface (UI) of the terminal; and
    determining the layout of the one or more components in the UI of the terminal based on the resource.

10. The method of claim 9, wherein the second type comprises the constraint relationships marked with a first keyword or a second keyword, wherein the constraint relationships marked with the first keyword are display scenarios, and wherein solving the second constraint relationship is based on first data of the terminal.

11. The method of claim 10, wherein the first type comprises the constraint relationships not marked with the first keyword or the second keyword.

12. The method of claim 10, wherein the display scenarios comprises at least one of a special-shaped screen scenario, a foldable-screen scenario, a landscape-mode display scenario, or a portrait-mode display scenario.

13. The method of claim 10, wherein the first data comprises a device parameter of the terminal and second data generated during running of the terminal.

14. An apparatus comprising:
a memory configured to store instructions; and
one or more processors coupled to the memory and configured to execute the instructions to cause the apparatus to:
obtain a plurality of constraint relationships in of a user interface (UI);
solve a first constraint relationship of a first type in the plurality of constraint relationships in an integrated development environment (IDE);
to calculate a first intermediate solution set based on the first constraint relationship; and
output the first intermediate solution set,
wherein a layout of one or more components in the UI is based on the first intermediate solution set and a second constraint relationship of a second type in the plurality of constraint relationships, and
wherein the second constraint relationship o for solving in a terminal or the IDE.

15. The apparatus of claim 14, wherein the second constraint relationship is related to a display scenario, or requires first data of the terminal for solving.

16. A terminal comprising:
a memory configured to store instructions; and
one or more processors coupled to the memory and configured to execute the instructions to cause the terminal to:
receive a resource file comprising at least one of a first intermediate solution set or constraint solution information, wherein the first intermediate solution set is based on a first constraint relationship of a first type, wherein the constraint solution information is based on the first intermediate solution set and a second constraint relationship of a second type, wherein the first constraint relationship of the first for solving in an integrated development environment (IDE), wherein the second constraint relationship is a for solving in the terminal or the IDE, and wherein constraint relationships describe a layout of one or more components in a user interface (UI) of the terminal; and
determine the layout of the one or more components in the UI of the terminal based on the resource file.

17. The terminal of claim 16, wherein the second type comprises the constraint relationships marked with a first keyword or a second keyword, and wherein the constraint relationships marked with the first keyword are display scenarios, and wherein solving the second constraint relationship is based on first data of the terminal.

18. The terminal of claim 17, wherein the first type comprises the constraint relationships not marked with the first keyword or the second keyword.

19. The terminal of claim 16, wherein the display scenarios comprise at least one of a special-shaped screen scenario, a foldable-screen scenario, a landscape-mode display scenario, or a portrait-mode display scenario.

20. The terminal of claim 17, wherein the first data comprises a device parameter of the terminal and second data based on running of the terminal.

* * * * *

UNITED STATES PATENT AND TRADEMARK OFFICE
CERTIFICATE OF CORRECTION

PATENT NO. : 11,947,982 B2
APPLICATION NO. : 18/351734
DATED : April 2, 2024
INVENTOR(S) : Tao Wen et al.

It is certified that error appears in the above-identified patent and that said Letters Patent is hereby corrected as shown below:

In the Claims

Claim 1, Column 47, Line 56: "based on a-the" should read "based on a the"

Claim 6, Column 48, Line 16: "further comprising=calculating" should read "further comprising calculating"

Claim 8, Column 48, Line 33: "comprising=calculating" should read "comprising calculating"

Claim 14, Column 49, Line 14: "to calculate" should read "calculate"

Claim 16, Column 50, Line 8: "is a for" should read "is for"

Signed and Sealed this
Thirtieth Day of April, 2024

Katherine Kelly Vidal
*Director of the United States Patent and Trademark Office*